United States Patent
Nagumo

(10) Patent No.: US 8,138,681 B2
(45) Date of Patent: Mar. 20, 2012

(54) DRIVING CIRCUIT, LED HEAD AND IMAGE FORMING APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 640 days.

(21) Appl. No.: 12/232,220

(22) Filed: Sep. 12, 2008

(65) Prior Publication Data

US 2009/0096493 A1    Apr. 16, 2009

(30) Foreign Application Priority Data

Sep. 13, 2007  (JP) .................................. 2007-238029

(51) Int. Cl.
    *H05B 41/36*  (2006.01)
(52) U.S. Cl. .................... 315/224; 315/209 R; 315/291; 347/224; 347/238; 347/247
(58) Field of Classification Search .............. 315/209 R, 315/224, 225, 226, 291, 299; 347/238, 247, 347/224
    See application file for complete search history.

(56) References Cited

U.S. PATENT DOCUMENTS

| 4,032,830 A * | 6/1977 | Buonavita ........................ 363/25 |
| 6,184,663 B1 * | 2/2001 | Imai et al. ...................... 323/274 |
| 2007/0176176 A1 * | 8/2007 | Yamazaki et al. ............... 257/59 |

FOREIGN PATENT DOCUMENTS

| JP | 06-340114 A | 12/1994 |
| JP | H-11-291550 | 10/1999 |
| JP | H11-291550 | * 10/1999 |
| JP | 2001-056669 | * 2/2001 |
| JP | 2002344297 A | * 11/2002 |
| JP | 2006-159472 A | 6/2006 |
| JP | 2007-210235 A | 8/2007 |

* cited by examiner

*Primary Examiner* — Jacob Y Choi
*Assistant Examiner* — Anthony Arpin
(74) *Attorney, Agent, or Firm* — Rabin & Berdo, P.C.

(57) ABSTRACT

In a driving circuit, a drive transistor supplies drive electric current to record elements to construct an array, and a reference electric current generating circuit that provides a control voltage to the drive transistor and controls the drive electric current, wherein the drive transistor is composed of a first PMOS transistor and a second PMOS transistor that are connected in series; and the reference electric current generating circuit has a resistance element and a operational amplifier that are used to set a reference electric current for deciding the control voltage, wherein an output of the operational amplifier is provided to a control terminal of the first PMOS transistor; and a drive electric current ON/OFF signal to control on/off of the drive electric current is provided to a control terminal of the second PMOS transistor.

17 Claims, 23 Drawing Sheets

DRIVING CIRCUIT, LED HEAD AND IMAGE FORMING APPARATUS

FIELD OF THE INVENTION

The invention relates to a driving circuit used in LED head, the LED head using the driving circuit and an image forming apparatus.

BACKGROUND OF THE INVENTION

A driving circuit used by LED head includes a LED driving and outputting section (hereinafter: LED driving and outputting circuit) to individually drive LED elements. A conventional LED driving and outputting circuit is constructed from a series connection of first and second PMOS transistors. A control voltage corresponding to a drive electric current value is supplied to gate of the first PMOS transistor, and a drive ON/OFF instruction signal is inputted to gate of the second PMOS transistor.

As stated in the a patent document 1 of Japan patent publication Hei 11-291550 and a patent document 2 of Japan patent publication 2001-056669, in the conventional LED driving and outputting circuit, because the control voltage corresponding to a drive electric current value is always supplied to the gate of the first PMOS transistor, its drain is kept by a voltage which is approximately equal to a power source voltage. Thereby, when a drive ON instruction signal is inputted to the gate of the second PMOS transistor in order to drive LED element to turn on, with the second PMOS transistor becomes ON, electric charge that keeps the drain in the voltage approximately equal to a power source voltage is discharged via the second PMOS transistor and LED element without any electric current control. As a result, when electric current that flows through LED element rises, peak electric current flows sharp. Because of the excessive peak electric current, the LED element degrades and its life becomes short.

SUMMARY OF THE INVENTION

It is, therefore, an object of the invention to provide a driving circuit capable of solving the above problem.

A first aspect of the invention is to provide a driving circuit. The driving circuit comprises a drive transistor that supplies drive electric current to record elements to construct an array; and a reference electric current generating circuit that provides a control voltage to the drive transistor and controls the drive electric current, wherein the drive transistor is composed of a first drive transistor and a second drive transistor that are connected in series; and the reference electric current generating circuit has a resistance element and a operational amplifier that are used to set a reference electric current for deciding the control voltage, wherein an output of the operational amplifier is provided to a control terminal of the first drive transistor; and a drive electric current ON/OFF signal to control on/off of the drive electric current is provided to a control terminal of the second drive transistor.

A second aspect of the invention is to provide a driving circuit. The driving circuit comprises a driving section that supplies drive electric current to record elements to construct an array; and a reference electric current generating circuit that provides a control voltage to the driving section and controls the drive electric current, wherein the drive section is composed of N series connection circuits that are connected in parallel, each series connection circuit being composed of a first drive transistor, a second drive transistor and a third drive transistor that are connected in series; and the reference electric current generating circuit has a resistance element and a operational amplifier that are used to set a reference electric current for deciding the control voltage, wherein an output of the operational amplifier is provided to a control terminal of the first drive transistor, a drive electric current adjustment signal to adjust an electric current value of the drive electric current is provided to a control terminal of the second drive transistor, and a drive electric current ON/OFF signal to control on/off of the drive electric current is provided to a control terminal of the third drive transistor.

A third aspect of the invention is to provide a driving circuit. The driving circuit comprises a driving section that supplies drive electric current to record elements to construct an array; and a reference electric current generating circuit that provides a control voltage to the driving section and controls the drive electric current, wherein the drive section has a main driving section that is composed of a first drive transistor and a second drive transistor that are connected in series; and a subsidiary driving section that is composed of N series connection circuits that are connected in parallel, each series connection circuit being composed of a first drive transistor, a second drive transistor and a third drive transistor that are connected in series, wherein the reference electric current generating circuit has a resistance element and a operational amplifier that are used to set a reference electric current for deciding the control voltage, wherein an output of the operational amplifier is provided to a control terminal of the first drive transistor, a drive electric current adjustment signal to adjust an electric current value of the drive electric current is provided to a control terminal of the second drive transistor, and a drive electric current ON/OFF signal to control on/off of the drive electric current is provided to a control terminal of the third drive transistor.

Further, the invention provides a LED head comprising the driving circuit of in the first, second and third aspects of the invention.

Furthermore, the invention provides an image apparatus has the LED head comprising the driving circuit of in the first, second and third aspects of the invention.

EFFECT OF THE INVENTION

According to the invention, the drive transistor is constructed by a series connection of a first drive transistor and a second drive transistor, an output of the operational amplifier is supplied to the control terminal of the first drive transistor, and a drive electric current ON/OFF signal to control ON/OFF of drive electric current is supplied to the control terminal of the second drive transistor, further, the output of the operational amplifier is moved for a predetermined time by a delaying circuit. Therefore, when the drive of LED is turned off, the first drive transistor becomes OFF-state; when preparing to drive the drive electric current of LED, the second drive transistor previously becomes ON-state. Therefore, without an accumulation of electric charge for parasitic capacitance of drain terminal of the first drive transistor, through a movement toward drive-ON of LED, the first drive transistor becomes ON-state, even if the drive electric current of LED rises, overshoot does not occur. As a result, it is possible to prevent excessive overshoot from occurring when electric current of LED rises; to prevent degradation of LED that is caused by peak electric current; and to prevent the life of LED from shortening.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Embodiment 1

First is to explain whole structure of a controlling system in an image forming apparatus including a driving circuit of the present invention, and explain its operation summary. In the explanation, regarding technology content in problem to be solved, it will be again explained in detail by using drawing.

Figure 1:
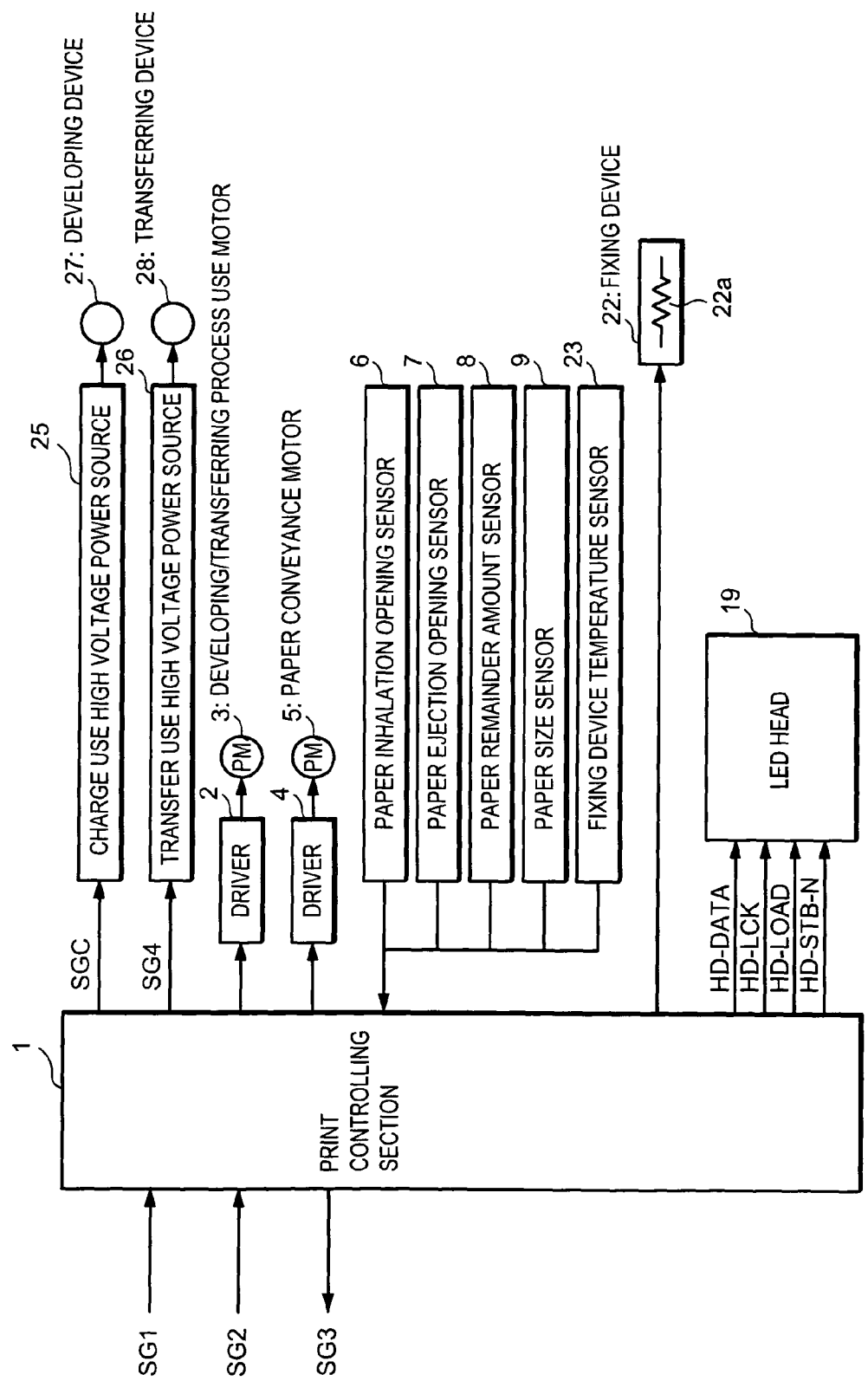
FIG. 1 is a block diagram of a printer controlling system in electrophotographic printer.

FIG. 1 is a block diagram of a printer controlling system in electrophotographic printer.

As shown by FIG. 1, a printer controlling system in electrophotographic printer comprises a print controlling section 1, a driver 2, a developing/transferring process use motor 3, a driver 4, a paper conveyance motor 5, a paper inhalation opening sensor 6, a paper ejection opening sensor 7, a paper remainder amount sensor 8, a paper size sensor 9, a LED head 19, a fixing device 22, a fixing device temperature sensor 23, a charge use high voltage power source 25, a transfer use high voltage power source 26, a developing device 27 and a transferring device 28.

The print controlling section 1, as a function block to perform a computer control function, is a part that uses RAM, input and output ports, timer and the like to control print process, through a microprocessor (not shown) executes predetermined control program previously stored in a ROM (not shown).

The print controlling section 1 is furnished inside a printing section of printer; sequences and controls the whole of the printer through control signal SG1, video signal SG2 (obtained by arrange dot map data in one dimension) and the like that come from a host controller (not shown); and performs print operation. When the print controlling section 1 received a print instruction through the control signal SG1, firstly, the print controlling section 1 uses the fixing device temperature sensor 23 to detect whether a temperature of the fixing device 22 with a built-in heater 22a is in a usable temperature range; if it is not in the usable temperature range, turns the heater 22a on the electric current so as to heat the fixing device 22 till a usable temperature.

Next, the print controlling section 1 controls the developing/transferring process use motor (PM) 3 to rotate via the driver 2, at the same time, turns the charge use high voltage power source 25 on through a charge signal SGC so as to perform a charge of the developing device 27. Then, an existence/inexistence and a kind of paper (not shown) that is set are detected by the paper remainder amount sensor 8 and the paper size sensor 9, and a paper conveyance suitable to the paper is started. Here, the paper conveyance motor (PM) 5 can rotate in two directions via the driver 4. Firstly, the paper conveyance motor 5 rotates along a converse direction to convey the paper only by a predetermined amount till the paper inhalation opening sensor 6 detected the paper. Continuously, the paper conveyance motor 5 rotates along a regular direction to convey the paper into a print mechanism inside the printer.

Here is to explain timing about control signals SG1, SG2, SG3, HD-DATA, HD-CLK, HD-LOAD, HD-STB-N that are sent or received by the print controlling section 1.

Figure 2:
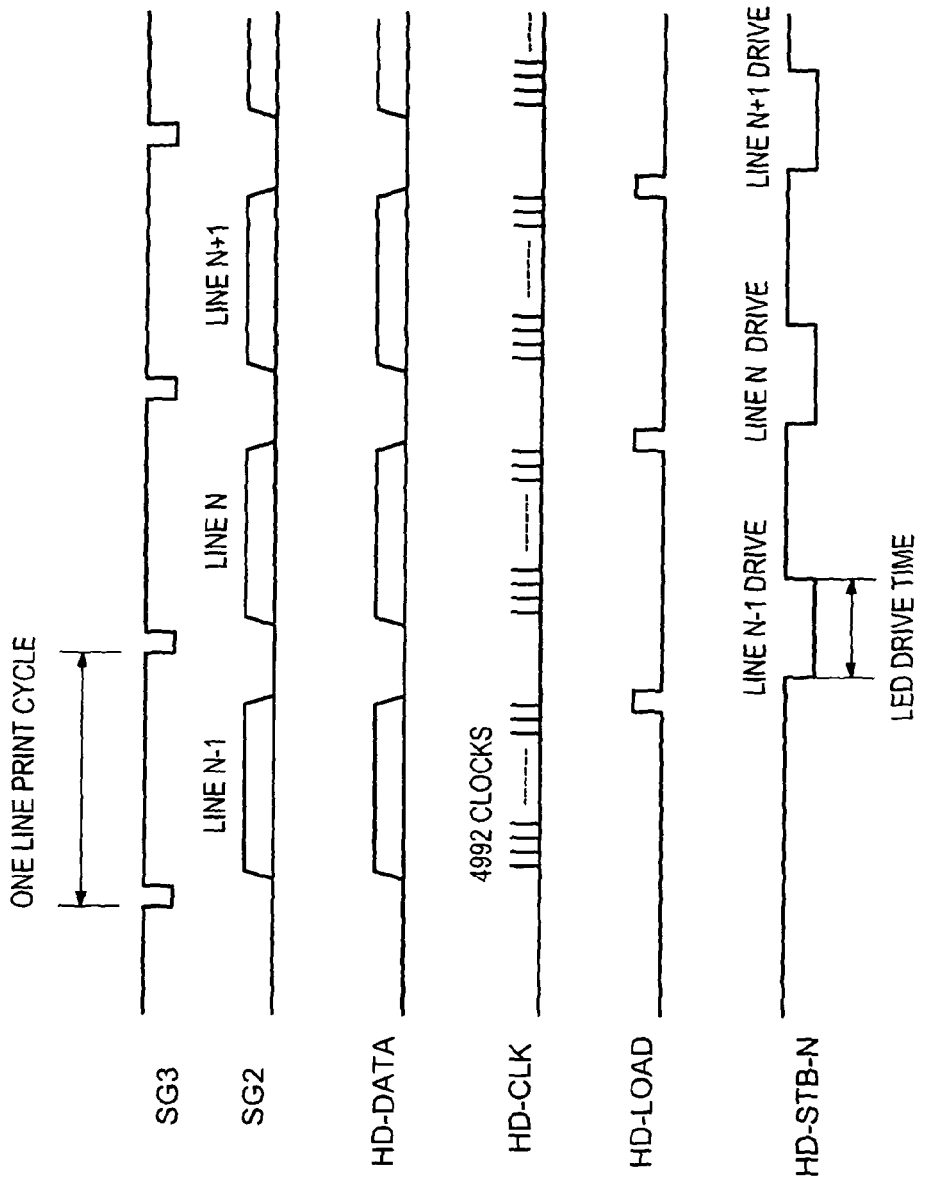
FIG. 2 is a timing chart of control signals in embodiment 1.

FIG. 2 is a timing chart of control signals in embodiment 1.

In the drawing, according to an order from top to bottom, a timing signal SG3, a video signal Sg2, a print data signal HD-DATA, a clock signal HD-CLK, a latch signal HD-LOAD, a strobe signal HD-STB-N are indicated. Through a control signal SG1 (not shown) is inputted to the print controlling section 1 (FIG. 1) from a host controller (not shown), a series of operations described below are started.

At the time that the paper reaches a printable position, the print controlling section 1 (FIG. 1) sends timing signal SG3 (containing main movement synchronized signal and subsidiary movement synchronized signal), and receives video signal SG2. The receiving of the video signal SG2 is performed per print line. The video signal SG2 that is edited per page in the host controller and is received by the print controlling section 1 (FIG. 1) is forwarded to the LED head 19 (FIG. 1) as the print data signal HD-DATA. The LED head 19 (FIG. 1) is formed by arranging plural LED elements on plural line for print respective dots (pixels).

Then, the print controlling section 1 (FIG. 1), when received the video signal SG2 of one line part, sends the latch signal HD-LOAD to the LED head 19 (FIG. 1), and controls data that is forwarded via the print data signal HD-DATA to be kept in the LED head 19 (FIG. 1). Further, even if the print controlling section 1 is receiving next video signal SG2 from the host controller, the print controlling section 1 (FIG. 1) also can print data kept in the LED head 19 (FIG. 1) concerning the print data signal HD-DATA. Moreover, the HD-CLK is clock signal for sending the print data signal HD-DATA to the LED head 19, the HD-STB-N is strobe signal. The following is continuously explain the printer controlling system in the electrophotographic printer by referring to FIG. 1 again.

Information printed by the LED head 19, as dots whose electric potential rose, is changed to an electrostatic latent image on a photosensitive drum (not shown) which is charged by minus electric potential. Then, in the developing device 27, toner which is charged by minus electric potential and is used for image formation use is absorbed electrically by respective dots so that a toner image is formed.

After that, on the one hand, the toner image is conveyed to the transferring device 28; on the other hand, the transfer use high voltage power source 26 with plus electric potential is turned on by a transfer signal SG4 (FIG. 1). The transferring device 28 transfers the toner image onto paper passing through the interval of the photosensitive drum and the transferring device 28.

The paper having the transferred toner image is conveyed to contact with the fixing device 22 with a built-in heater 22a, and the toner image is fixed on the paper by the heat of the fixing device 22. The paper having the fixed image is further conveyed to pass the paper ejection opening sensor 7 from the print mechanism of the printer, and is ejected to the outside of the printer.

To correspond to the detections of the paper size sensor 9 and the paper inhalation opening sensor 6, the print controlling section 1 supplies voltage outputted from the transfer use high voltage power source 26 to the transferring device 28 only when the paper passes the transferring device 28. Then, after print ended and the paper passed the paper ejection opening sensor 7, the print controlling section 1 stops supplying voltage outputted from the charge use high voltage power source 25 to the developing device 27 together with stopping the rotation of the developing/transferring process use motor 3. Hereafter, the above-described operations are repeated. In the above explanation, the driving circuit of the present invention is contained in the LED head 19. The following is to explain a summary of the LED head 19.

Figure 3:
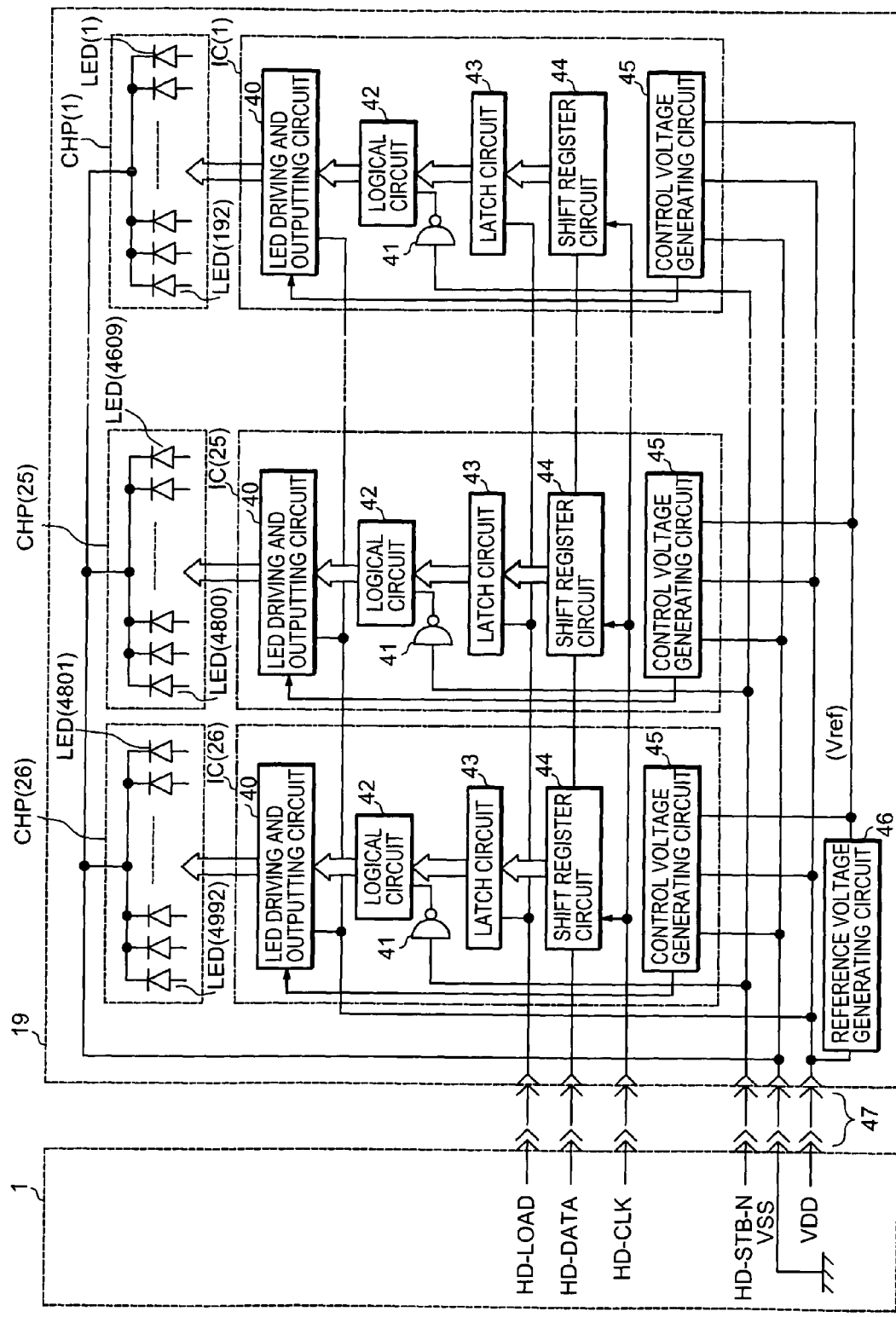
FIG. 3 is a block diagram showing a structure of a LED head in embodiment 1.

FIG. 3 is a block diagram showing a structure of a LED head in embodiment 1.

The drawing shows a connection relation between the LED head 19 and the print controlling section 1. As shown by FIG. 3, the print controlling section 1 is connected with the LED head 19 via a connection cable 47. (Note: the "->>-" in drawing is circuit symbol to represent connection connector.)

In the following explanation, an example is given about a LED head which can perform print with respect to paper of A4 size in a resolution of 600 dots per one inch. Then, its concrete structure will be explained. In the example, the total number of the LED elements is 4992 dots. For that, 26 LED arrays are arranged, and each array includes 192 LED elements.

In the drawing, CHP(1)~CHP(26) are LED arrays, the representation of CHP(2)~CHP(24) is omitted. IC(1)~IC(26) are driver to correspond to the CHP(1)~CHP(26). The LED arrays CHP(1)~CHP(26) are used to drive. Each driver IC is an integrated circuit that integrates driving circuits.

Each driver IC is formed by an identical circuit, two adjoining driver ICs are connected by cascading. LED(1)~LED(192) are LED elements belonging to LED array CHP(1). In each LED array, 192 LED elements are furnished. Thus, LED(4609)~LED(4800) belongs to LED array CHP(25) and LED(4801)~LED(4992) belongs to LED array CHP(1).

Therefore, in the LED head 19 shown by FIG. 3, on a print wiring board (not shown), 26 LED arrays (CHP(1)~CHP(26)) and 26 driver ICs (IC(1)~IC(26)) to respectively drive the CHP(1)~CHP(26) are arranged and furnished as facing each other. Each driver IC, as one chip, can drive 192 LED elements, thus, 26 chips are connected in cascade so that print data inputted from the outside can be serially forwarded.

Regarding the structure shown by FIG. 3, it is sequentially explained below.

The respective drivers IC(1)~IC(26) are formed by an identical circuit and are connected in cascade. The driver IC includes a shift register circuit 44 that receives the clock signal HD-CLK to perform a shift forwarding of print data; a latch circuit 43 that latches output signal of the shift register circuit 44 according to the latch signal HD-LOAD; an inverter circuit 41; a logical circuit 42; a LED driving and outputting circuit 40 that supplies drive electric current outputted from power source voltage VDD to the LED element (CHP(1) etc.) according to the output signal of the logical circuit 42; and a control voltage generating circuit 45 that generates an instruction voltage so that the drive electric current of the LED driving and outputting circuit 40 becomes constant. Moreover, it will be explained later that the driving circuit (driver IC) in the embodiment 1 has characters in the LED driving and outputting circuit 40, the logical circuit 42, and the control voltage generating circuit 45.

The strobe signal HD-STB-N is inputted to the inverter circuit 41. Further, there is a reference voltage generating circuit 46, its power source is connected with the power source voltage VDD, its ground terminal is connected with the ground of the LED head 19, its output is connected with the control voltage generating circuits 45 of the IC(1)~IC(26) so as to supply a predetermined reference voltage Vref. Moreover, the respective signals of the print data signal HD-DATA, the clock signal HD-CLK, the latch signal HD-LOAD and the strobe signal HD-STB-N are sent from the print controlling section 1 when printing.

Next, before explaining in detail the LED driving and outputting circuit 40 and its peripherals circuit in that the present invention is applied, in order to clear the character of the LED driving and outputting circuit 40 and its peripherals circuit of the present invention, first is to explain in detail a conventional peripherals circuit of the LED driving and outputting circuit 40 and its circuit operation in a comparison example. In the explanation, a problem to be solved will be mentioned again.

Figure 4:
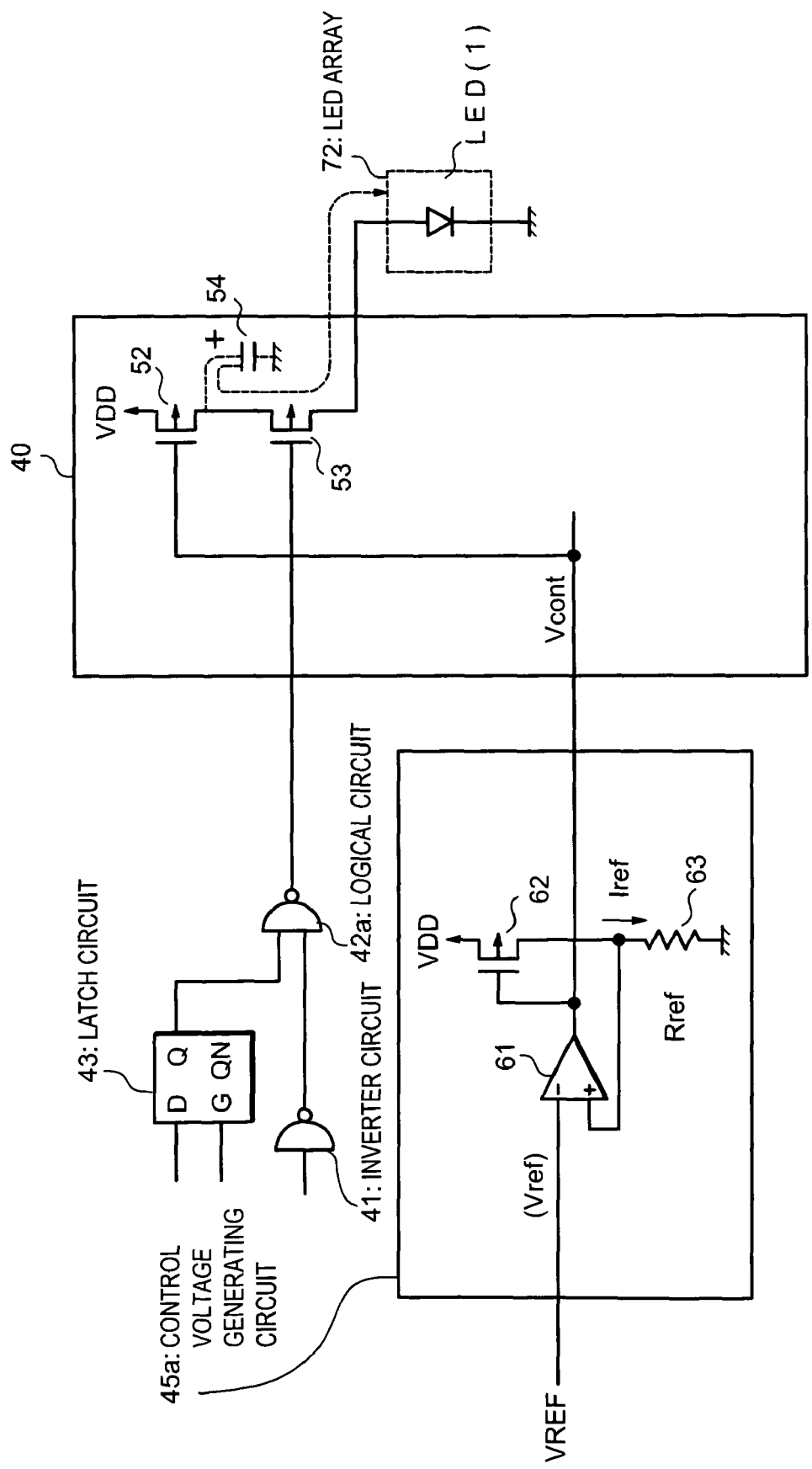
FIG. 4 is a diagram showing a peripherals circuit of a LED drive output circuit in a comparison example.

FIG. 4 is a diagram showing a peripherals circuit of a LED drive output circuit in a comparison example.

In FIG. 4, a conventional peripherals circuit of the LED driving and outputting circuit 40 is shown. As shown by FIG. 4, the conventional peripherals circuit includes a LED driving and outputting circuit 40, an inverter circuit 41, a logical circuit 42a, a latch circuit 43 and a control voltage generating circuit 45a.

In the drawing, the logical circuit 42a is a NAND circuit. In the driver IC (driving circuit) shown by FIG. 3, because 192 drive output terminals are provided, so in the logical circuit 42a, the latch circuit 43, PMOS transistors 52, 53 that are described below, respectively, 192 drive terminals are provided. With respect to such structure, the control voltage generating circuit 45a, as an inside component element of the driver IC, only has a terminal for each driver IC.

An input D of the latch circuit 43 is connected with an output of a shift register circuit (not shown, it is equal to the shift register circuit 44 in FIG. 3), an input G receives a latch signal HD-LOAD. An output Q of the latch circuit 43 is connected with one input terminal of the logical circuit 42.

In the LED driving and outputting circuit 40, there are two PMOS transistors 52 and 53. A source terminal of the PMOS transistor 52 is connected with a power source voltage VDD, a drain terminal of the PMOS transistor 52 is connected with a source terminal of the PMOS transistor 53, a drain terminal of the PMOS transistor 53 is connected with an anode of a LED (1). A gate terminal of the PMOS transistor 53 is connected with an output terminal of the logical circuit 42a, a gate terminal of the PMOS transistor 52 is connected with an output terminal of a operational amplifier 61 that is described below.

In the control voltage generating circuit 45a, as shown in drawing, a operational amplifier 61 has an output voltage an electric potential Vcont; a resistance 63 has a resistance value Rref. Further, there is a PMOS transistor 62, its gate length is equal to that of the PMOS transistor 52. VREF is a reference voltage generated by the reference voltage generating circuit 46 in FIG. 3, and it is supplied to a reversion input terminal of the operational amplifier 61.

A source terminal of the PMOS transistor 62 is connected with the power source voltage VDD, a gate terminal of the PMOS transistor 62 is connected with an output terminal of the operational amplifier 61, a drain terminal of the PMOS transistor 62 is connected with one end of the resistance 63 and with a non-reversion input terminal of the operational amplifier 61. The operational amplifier 61, the PMOS transistor 62 and the resistance 63 constructs a feedback control circuit, in which, the electric current flowing through the resistance Rref, that is, the electric current flowing through the PMOS transistor 62, is decided only by the values of the Vref and the Rref without depending upon the power source voltage VDD.

The gate electric potentials of the PMOS transistor 52 and the PMOS transistor 62 are equal to the Vcont, their source electric potentials also are equal. Because of that, the PMOS transistor 52 and the PMOS transistor 62 have equal voltage between gate and source so that they have a relation of current mirror.

Thus, by the reference voltage Vref, it is possible to adjust drain electric current of the PMOS transistor 62 and the PMOS transistor 52, and it is possible to control the drive electric current of the LED (1) belonging to the LED array 72 at a predetermined value.

Further, the PMOS transistor 53 is instructed to drive on through the print data latched by the latch circuit 43. When the strobe signal HD-STB-N becomes ON, the gate electric potential of the PMOS transistor 53 is changed to Low level, becomes ON-state. At that time, the drain electric current produced in the PMOS transistor 53 is decided according to the voltage supplied in between gate and source of the PMOS transistor 62 or the PMOS transistor 52, the PMOS transistor 53 functions as a switching element to switch on or off the electric current.

Further, in the LED driving and outputting circuit 40, there is a condenser 54, its one end is connected with the drain terminal of the PMOS transistor 52, its other end id connected with ground. The condenser 54 models and represents the parasitic capacitance generating between the drain terminal of the PMOS transistor 52 and the source terminal of the PMOS transistor 53, when the PMOS transistor 52 always is in ON-state and the PMOS transistor 53 is turned off, the electric potential of the drain terminal of the PMOS transistor 52 approximately is equal to the electric potential VDD, the condenser 54 is also charged by the electric potential VDD.

Because of that, with the drive state of the LED (1) is changed from OFF to ON, the PMOS transistor 53 moves from OFF to ON, at that time, the electric charge charged in the condenser 54 is rapidly discharged toward the LED (1). With an completion of discharging, the anode electric current of the LED (1) becomes an electric current value according to the drive state of the PMOS transistor 52, the great overshoot caused by the discharged electric current is inhibited. Regarding the concrete content, it will be explained by using a timing chart.

Figure 5:
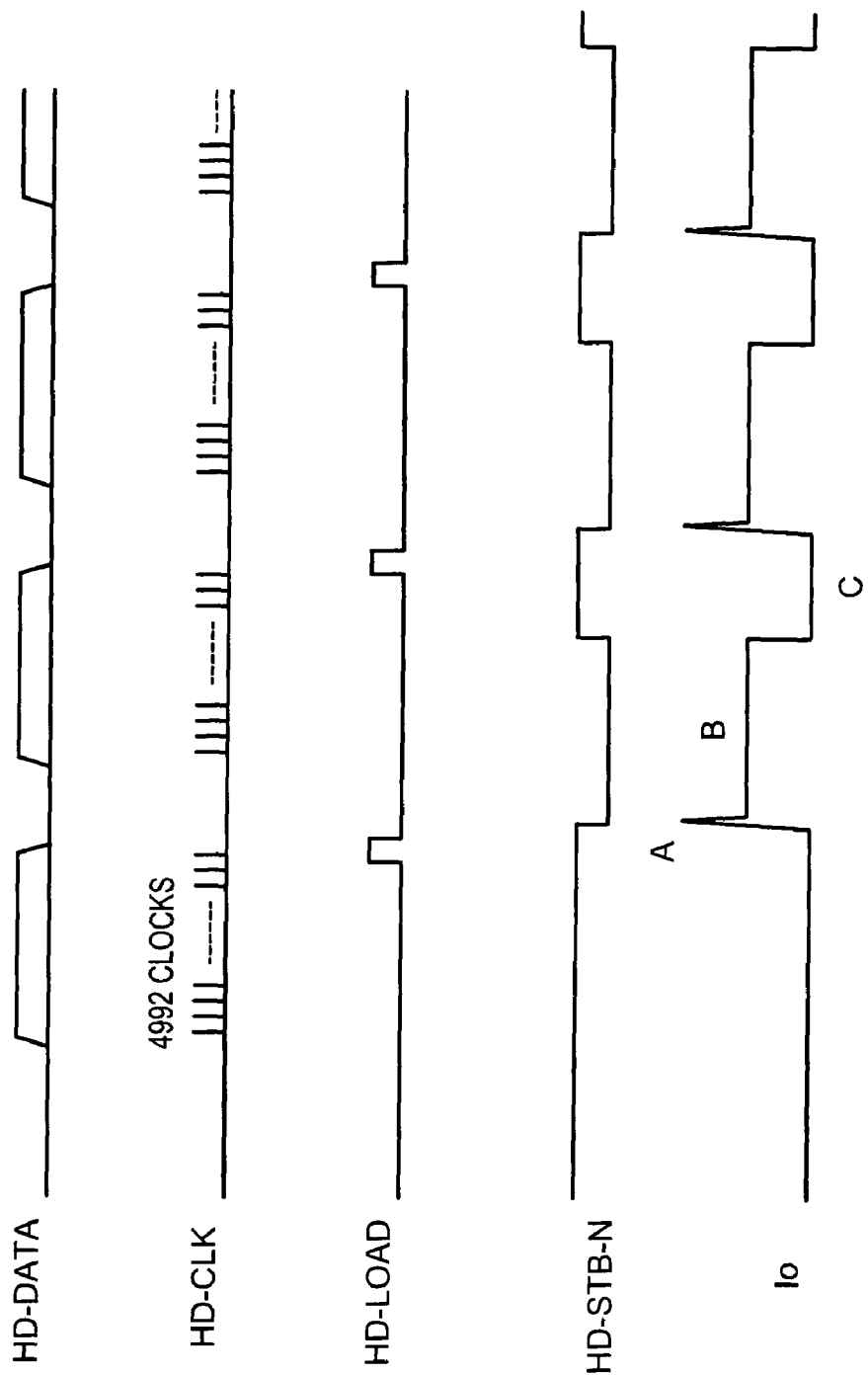
FIG. 5 is a timing chart for explaining operation of a LED drive output circuit in a comparison example.

FIG. 5 is a timing chart for explaining operation of a LED drive output circuit in a comparison example.

As shown by FIG. 5, according to the clock signal HD-CLK and the print data signal HD-DATA, print data is forwarded; continuously, according to the latch signal HD-LOAD, the forwarded print data is latched; further, according to the strobe signal HD-STB-N, the LED (1) (FIG. 4) is driven on the basis of the forwarded print data.

As shown by part "A" in FIG. 5, when the strobe signal HD-STB-N drops, the LED (1) (FIG. 4) is started to drive. At that time, as shown by the rise part in electric current waveform, great overshoot occurs. The overshoot waveform is inhibited in a shorter time, then, the electric current is kept in a predetermined electric current value as shown by part "B" in FIG. 5. With the strobe signal HD-STB-N becomes ON, as shown by part "C", the electric current returns to zero.

The peak value of the overshoot electric current is generated when connectively discharging electric charge that is charged in the parasitic condenser (FIG. 4) toward the LED (1) via the switch formed by the PMOS transistor 53. Because of resistance components to limit electric current such as an ON-resistance of the PMOS transistor 53, a wiring resistance of the inside of the LED (1) and the like, even if they are very little resistance, the peak electric current value caused by the resistance reaches a value that is several decades times the value assumed as a drive condition of the LED (1).

In the case that such excessive electric current flows through the LED element, even if its continuing time is short, the influence is not small. It will make the LED element degrade and drop light emitting efficiency for a long period. Because the overshoot electric current is caused by some factors to make correct control become difficult such as the ON-resistance of the PMOS transistor 53, the wiring resistance of the inside of the LED (1) or the like, in LED head device including plural LED elements, in the case that to use these LED elements for a long time, their degradation statuses are different. As a result, between light emitting powers of these LED elements, difference occurs so that print density becomes uneven, it is not desirable.

The structure of the PMOS transistor 52 and the PMOS transistor 53 is used to drive driven-element through furnishing a second transistor that serves as a switch element to control drive state to become ON or OFF, onto a first transistor that controls drive electric current. As similar structure, it is well-known as disclosed by the patent document 2 of Japan patent publication 2001-056669.

The driving circuit of the patent document 2 drives driven-element that is connected with it, through furnishing a first transistor serving as a switching element to control drive state to become ON or OFF and furnishing a second transistor that controls drive electric current onto the first transistor. Though such structure can obtain an effect to reduce overshoot electric current caused when starting to drive the driven element, because the first transistor is intervening, difference occurs in electric current instruction state of the second transistor due to unevenness of ON-resistance of the first transistor, then, new electric current value unevenness occurs in each drive output terminal. Thereby, it is impossible to completely solve such problem.

The above description explained the problem to be solved concerning the present invention. The following is to explain in detail a driving circuit of the present invention in detail.

Figure 6:
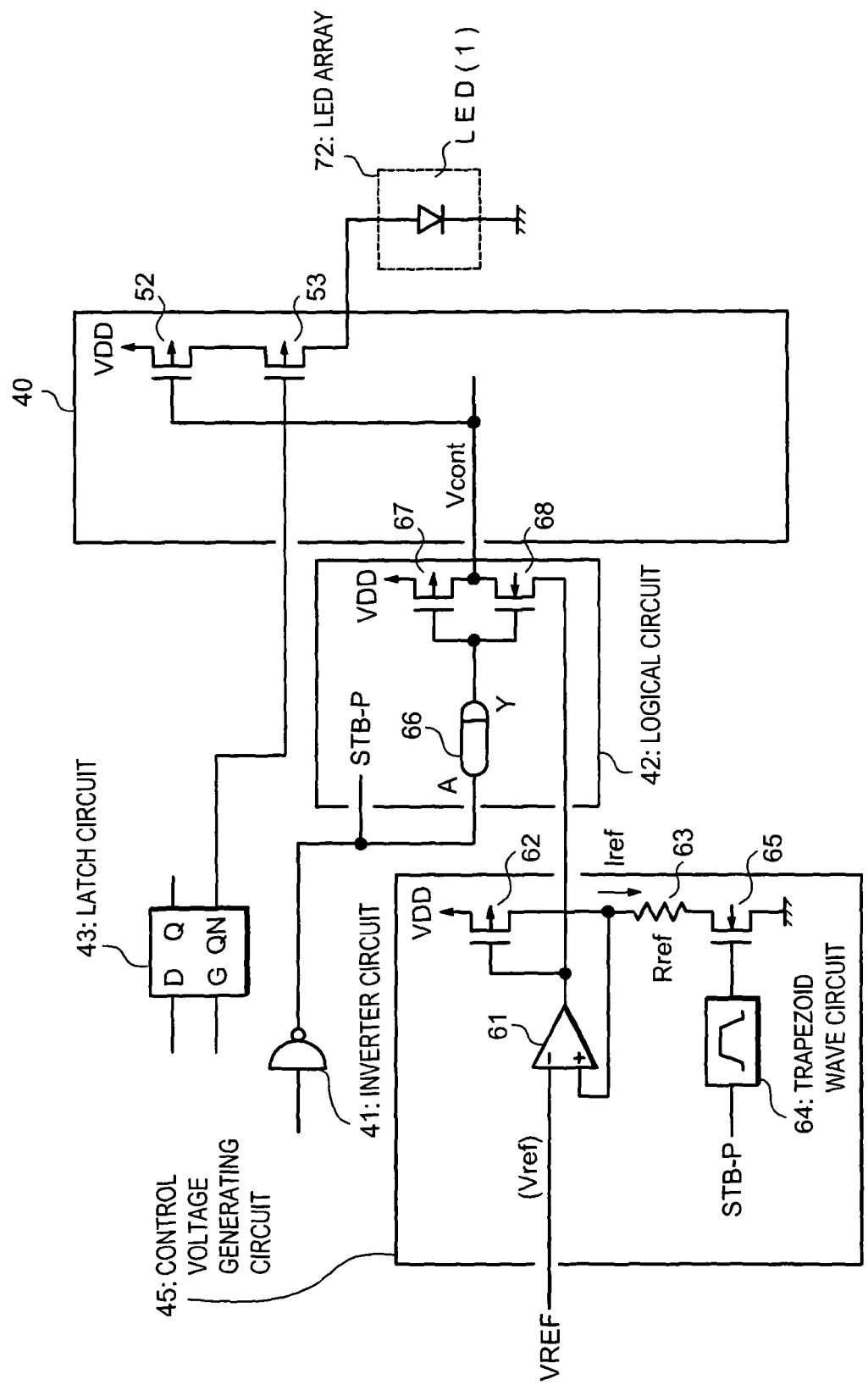
FIG. 6 is a diagram showing a peripherals circuit of a LED drive output circuit in the present invention.

FIG. 6 is a diagram showing a peripherals circuit of a LED drive output circuit in the present invention.

In FIG. 6, a peripherals circuit structure of the LED driving and outputting circuit 40 of the present invention is shown. As shown by FIG. 6, the peripherals circuit structure of the present invention includes a LED driving and outputting circuit 40, an inverter circuit 41, a logical circuit 42, a latch circuit 43 and a control voltage generating circuit 45. In the drawing, a connection relation between the LED driving and outputting circuit 40 and the peripherals circuit is shown, as a representation, the LED (1) is expressed to correspond to one dot. The following is to only explain in detail the different part different from the comparison example. Regarding the same part as the comparison example, it is appended the same symbol and its explanation is omitted.

The logical circuit 42 contains a delay circuit 66, a PMOS transistor 67 to form an inverter, and a NMOS transistor 68. An input terminal of the delay circuit 66 is connected with an output of the inverter circuit 41, and is supplied by a positive logic strobe signal STB-P. An output terminal of the delay circuit 66 is connected with gate terminals of the PMOS transistor 67 and the NMOS transistor 68 that construct an inverter.

In the PMOS transistor 67 and the NMOS transistor 68 to construct an inverter, a source terminal of the PMOS transistor 67 is connected with a power source voltage VDD, a drain terminal of the PMOS transistor 67 is connected with a drain terminal of the NMOS transistor 68, a source terminal of the NMOS transistor 68 is connected with an output terminal of the operational amplifier 61. The two gate terminals of the PMOS transistor 67 and the NMOS transistor 68 are connected with the output of the delay circuit 66. Further, the two drain terminals of the PMOS transistor 67 and the NMOS transistor 68 are connected with a gate terminal of the PMOS transistor 52. Moreover, the gate electric potential of the PMOS transistor 52 is marked by Vcont as shown in drawing.

The latch circuit 43 is connected with the gate of the PMOS transistor 53 (FIG. 4) via the logical circuit 42a (FIG. 4) in comparison example, but is directly connected with the gate of the PMOS transistor 53 without the logical circuit 42 in eh present invention.

As compared the control voltage generating circuit 45 with the control voltage generating circuit 45a (FIG. 4) in comparison example, in the control voltage generating circuit 45, a NMOS transistor 65 is inserted between a resistance 63 and ground. That is, a source terminal of the PMOS transistor 62 is connected with the power source voltage VDD, a gate terminal of the PMOS transistor 62 is connected with an output terminal of the operational amplifier 61, and a drain terminal of the PMOS transistor 62 is connected with one end of a resistance 63 and a non-reversion terminal of the operational amplifier 61. Another end of the resistance 63 is connected with a drain terminal of the NMOS transistor 65, a source terminal of the NMOS transistor 65 is connected with the ground. Further, a trapezoid wave circuit 64 is connected with a gate terminal of the NMOS transistor 65, the positive logic strobe signal STB-P is inputted to an input terminal of the trapezoid wave circuit 64.

The operational amplifier 61, the PMOS transistor 62, the resistance 63, and the NMOS transistor 65 construct a feedback control circuit, in the structure, the electric current that flows through the resistance 63 and the PMOS transistor 62 is decided by the Vref, the Rref and the value of ON-resistance of the NMOS transistor 65 without depending upon the power source voltage VDD. Further, the output of the operational amplifier 61 is connected with the source terminal of the NMOS transistor 68.

In the circuit structure, when preparing to drive the LED (1), the positive logic strobe signal STB-P becomes "High" level. The positive logic strobe signal STB-P is the same as the positive logic strobe signal STB-P which serves as input signal after being delayed by the delay circuit 66. At that time, the PMOS transistor 67 becomes OFF state, and the NMOS transistor 68 becomes ON state.

In such state, the gate electric potential of the PMOS transistor 62 is equal to the Vcont, and the source electric potentials of the PMOS transistor 62 and the PMOS transistor 52 are equal. In the PMOS transistor 62 and the PMOS transistor 62, because the voltages between gate and source are equal, they have a relation of current mirror. Thus, by the reference voltage Vref, it is possible to adjust drain electric current of the PMOS transistor 62 and the PMOS transistor 52, and it is possible to control the drive electric current of the LED (1) belonging to the LED array 72 at a predetermined value.

Here is to explain operation when driving the LED (1).

The gate electric potential of the PMOS transistor 53 is set according to the print data latched by the latch circuit 43. When the print data becomes ON so that a drive instruction is formed, the output Q of the latch circuit 43 becomes "High", and the output terminal QN becomes "Low" level. Because the output signal of the terminal QN is inputted to the gate of the PMOS transistor 53, the PMOS transistor 53 becomes ON. As stated below, at that time, because the PMOS transistor 52 does not yet become ON state, the drive electric current of LED does not yet occur.

Next, when the positive logic strobe signal STB-P becomes ON, the output signal of the trapezoid wave circuit 64 becomes "High" level, the NMOS transistor 65 becomes ON state, so the another end is connected with the ground. At that time, the drain electric current (Iref) of the PMOS transistor 62 is mainly decided by the reference voltage Vref and the resistance value Rref, then, electric current having a proportion relation with the drain electric current Iref occurs in the PMOS transistor 52. Thus, drive electric current flows through the PMOS transistor 53 which is in ON state to drive the LED (1) via an output terminal (not shown).

Next, it is to sequentially explain the structures of the drive transistor, the delay element, and the trapezoid wave circuit.

Figure 7:
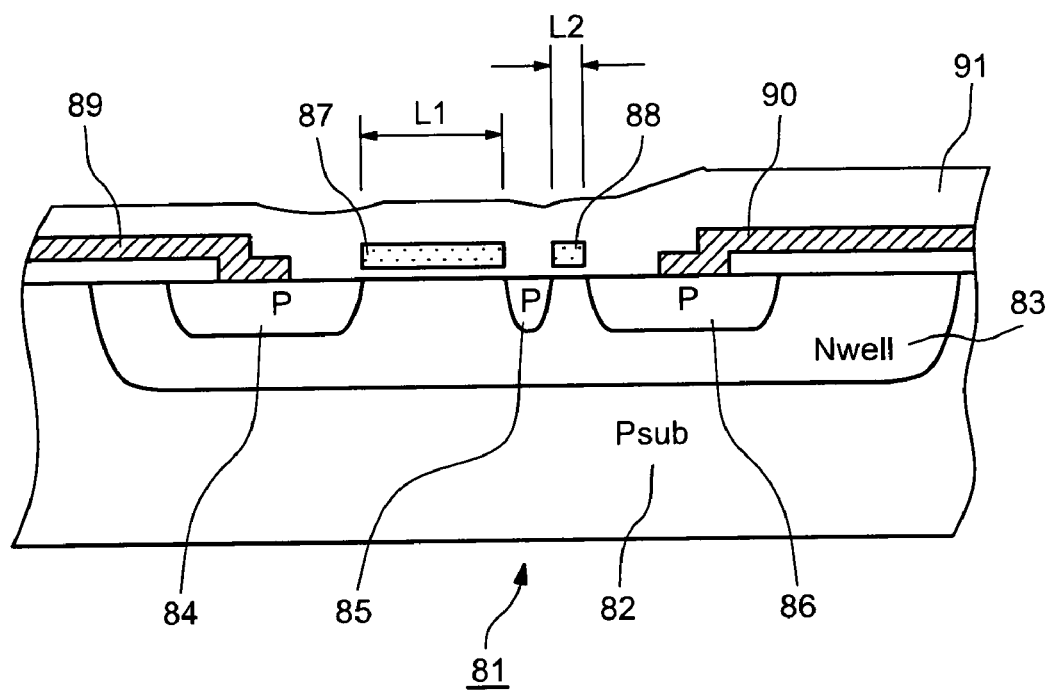
FIG. 7 is a cross section of a drive transistor in embodiment 1.

FIG. 7 is a cross section of a drive transistor in embodiment 1.

In FIG. 7, the structures of a drive transistor, the PMOS transistor 52 and the PMOS transistor 53 are shown. The cross section is obtained along a direction which is orthogonal with wirings of source, gate and drain of the drive transistor.

In the structure, there are an IC chip 81, a P type region 82 which represents a substrate layer, a N type well region 83 formed in the P type region 82, and P type regions 84~86 formed in the N type well region 83. Further, there is a gate wiring 87, it corresponds to the gate of the PMOS transistor 52 in FIG. 6, and there is a gate wiring 88, it corresponds to the gate of the PMOS transistor 53 in FIG. 6, their gate lengths respectively are "L1" and "L2" as shown by FIG. 7.

Furthermore, there are a metal wiring 89 which is connected with the P type region 84 (corresponding to the source terminal of the PMOS transistor 52) and with the power source voltage VDD (not shown); a metal wiring 90 which is connected with the P type region 86 (corresponding to the drain terminal of the PMOS transistor 53) and with a drive output terminal (not shown); and a protective film 91 covering on the upper surface of the IC chip 81.

Figure 8A:
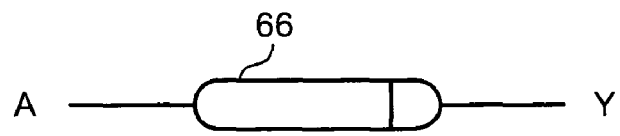
FIG. 8A is a diagram showing a logical symbol for explaining a structure of a delaying element.
Figure 8B:
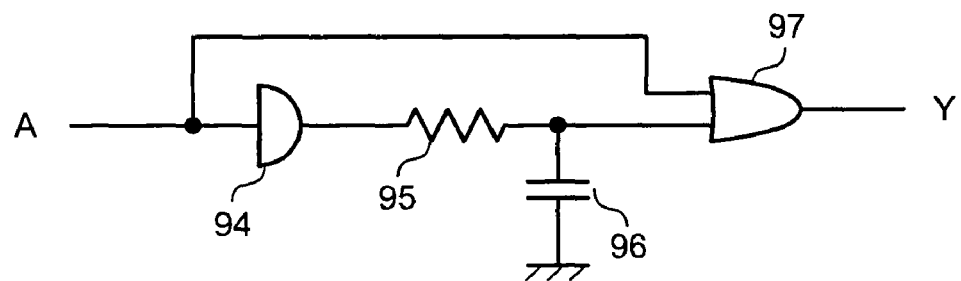
FIG. 8B is a diagram showing an internal circuit for explaining a structure of a delaying element.

FIG. 8A is a diagram showing a logical symbol for explaining a structure of a delaying element; FIG. 8B is a diagram showing an internal circuit for explaining a structure of a delaying element; and FIG. 8C is a diagram showing waveforms of input terminal, output terminal and internal node for explaining a structure of a delaying element.

In FIG. 8B, a buffer circuit 94, a resistance 95, a condenser 96 and an OR circuit 97 are shown. An input terminal of the buffer circuit 94 corresponds to the input terminal A of the delay circuit 66, an output terminal of the buffer circuit 94 is connected with one end of the resistance 95; another end of the resistance 95 is connected with one input terminal of the OR circuit 97 and one end of the condenser 96. Another end of the condenser 96 is connected with ground. Further, another input terminal of the OR circuit 97 is connected with the input terminal A, an output terminal of the OR circuit 97 corresponds to an output terminal Y of the delay circuit 66.

Figure 8C:
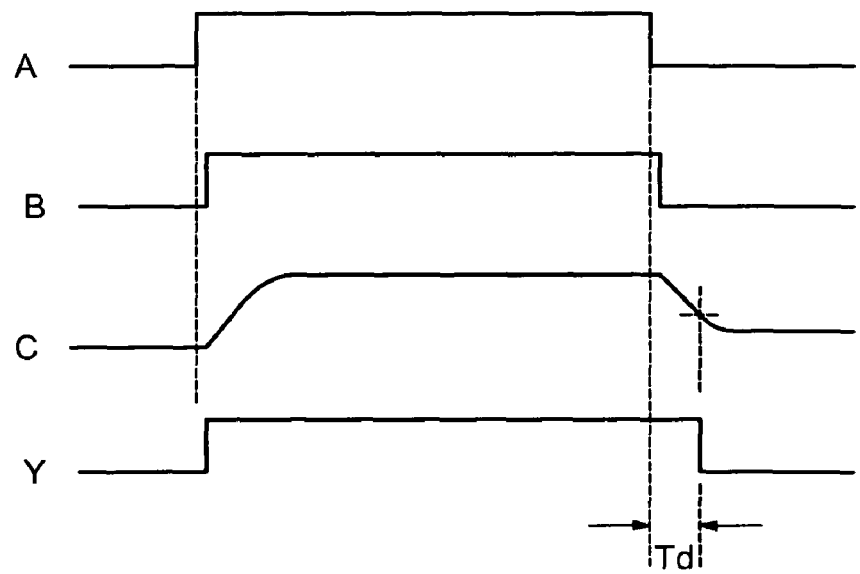
FIG. 8C is a diagram showing waveforms of input terminal, output terminal and internal node for explaining a structure of a delaying element.

In the FIG. 8C, an input waveform A of the input terminal A is shown; an output waveform B of the buffer circuit 94 is shown; a terminal waveform C of the condenser 96 is shown; and an output waveform Y of the OR circuit 97 is shown. As shown by the input waveform A, when a signal A is inputted to the input terminal A, through a little signal delay, the waveform B is outputted.

The signal B is inputted to the one end of the resistance 95, then, the charge/discharge waveform C occurs on the basis of a time constant decided by the resistance 95 and the condenser 96. The waveform C is inputted to the one input terminal of the OR circuit 97, and the signal A is inputted to another input terminal of the OR circuit 97. Then, the OR circuit 97 performs a logical calculation according to the waveform C and the signal A, and generates the output waveform Y, as shown by the drop part of the output waveform Y, a delay time Td is provided.

Figure 9A:
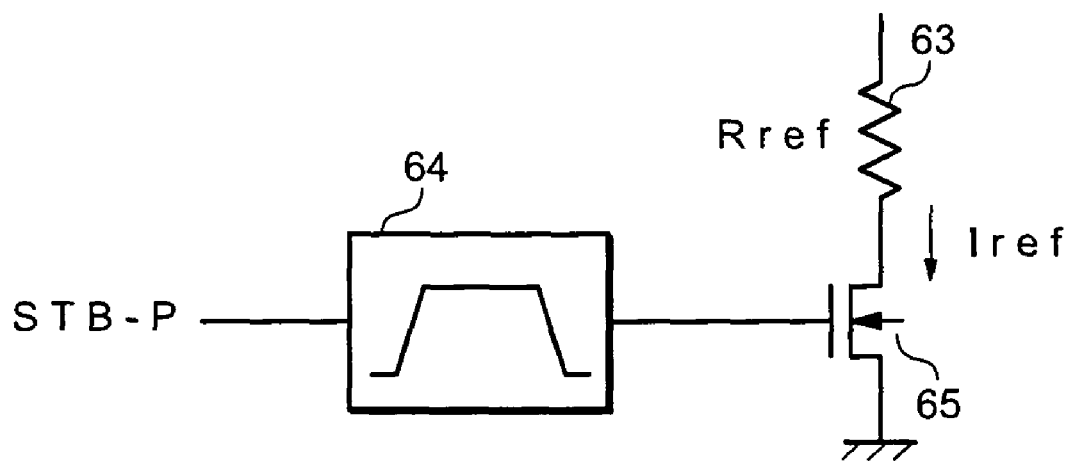
FIG. 9A is a diagram showing a logical symbol of a trapezoid wave circuit for explaining structures of trapezoid wave circuit and its peripherals circuit.
Figure 9B:
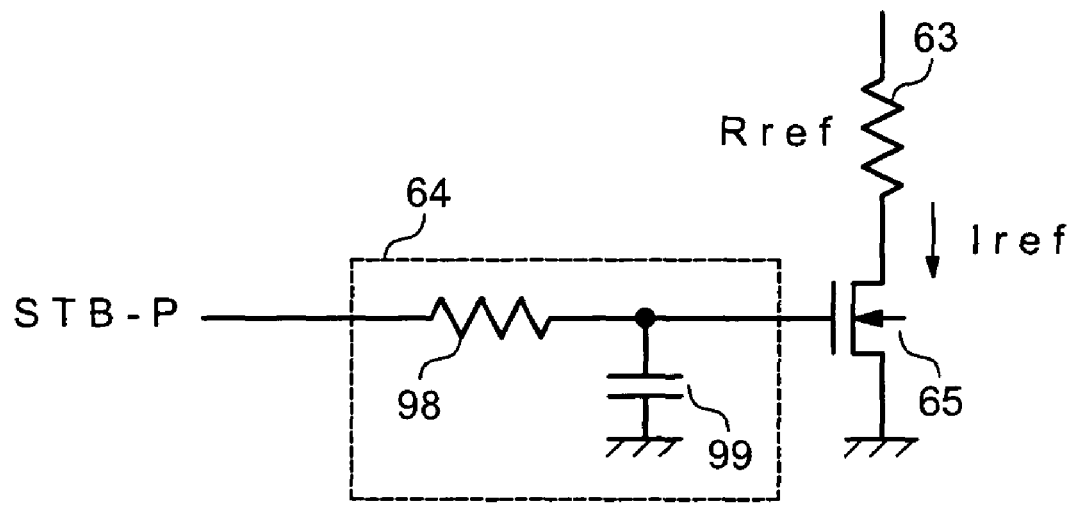
FIG. 9B is a diagram showing an internal structure of a trapezoid wave circuit for explaining structures of trapezoid wave circuit and its peripherals circuit.

FIG. 9A is a diagram showing a logical symbol of a trapezoid wave circuit for explaining structures of trapezoid wave circuit and its peripherals circuit; FIG. 9B is a diagram showing an internal structure of a trapezoid wave circuit for explaining structures of trapezoid wave circuit and its peripherals circuit; and FIG. 9C is a diagram showing waveforms of input terminal, output terminal and internal node for explaining structures of trapezoid wave circuit and its peripherals circuit.

In FIG. 9B, a resistance 98 and a condenser 99 are shown. One end of the resistance 98 is an input terminal of the trapezoid wave circuit 64; another end of the resistance 98 is an output terminal of the trapezoid wave circuit 64 and is connected with the condenser 99 and with the gate terminal of the NMOS transistor 65.

Figure 9C:
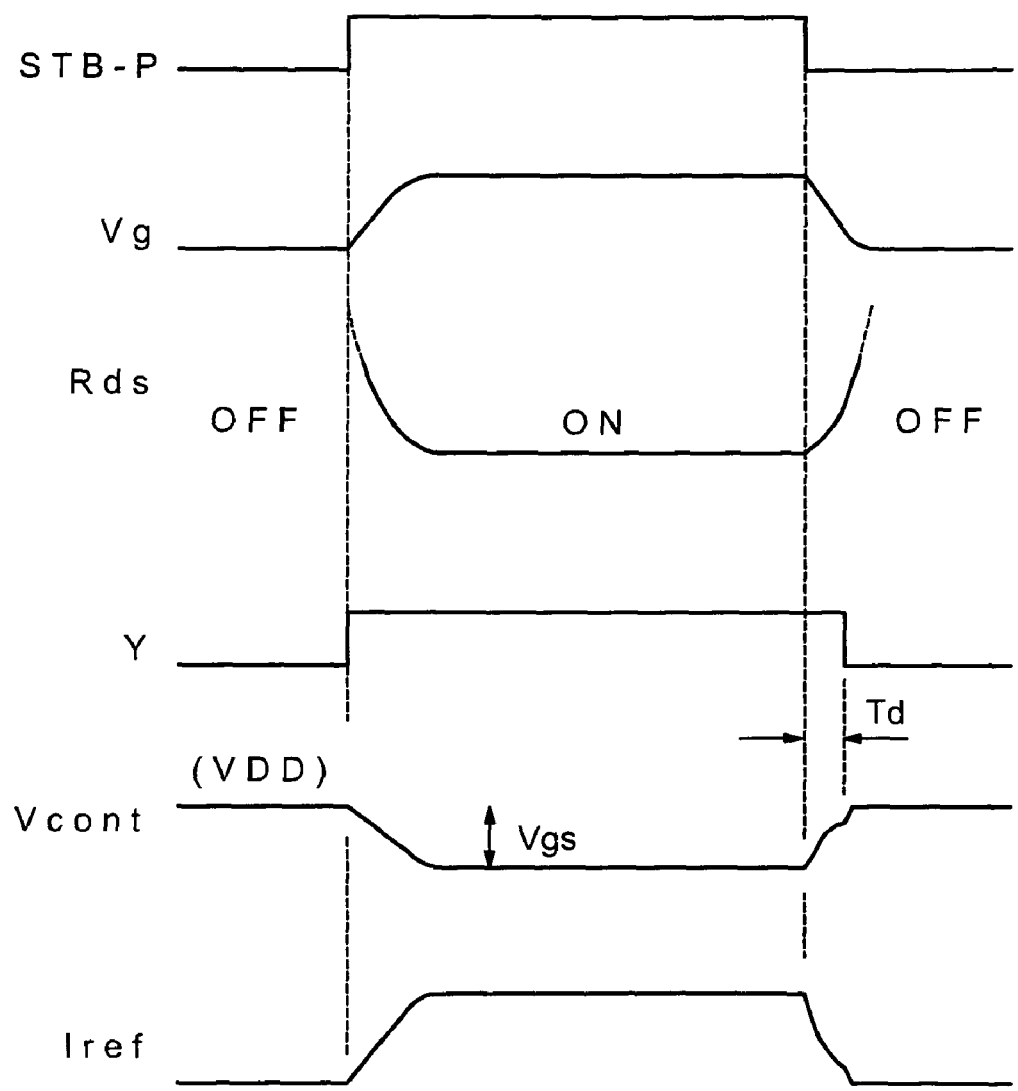
FIG. 9C is a diagram showing waveforms of input terminal, output terminal and internal node for explaining structures of trapezoid wave circuit and its peripherals circuit.

In the FIG. 9C, a positive logic strobe signal STB-P is an input waveform of the trapezoid wave circuit 64. Vg is a gate waveform of the NMOS transistor 65. Rds represents a resistance between drain and source of the NMOS transistor 65. Y is an output waveform of the delay circuit 66 shown by FIG. 8. Vcont is a gate terminal waveform of the PMOS transistor 52. Iref is electric current flowing to the resistance 63.

When the positive logic strobe signal STB-P is inputted and moves to "High" from "Low", the waveform Vg slowly rises. The waveform Vg is provided to the gate terminal of the NMOS transistor 65, the resistance Rds between drain and source slowly decreases from a value of infinity and drops to a value approximately approaching "0" Ohm. The resistance Rds is added to the resistance value Rref of the resistance 63 to decide the reference electric current Iref. Then, the waveform of the reference electric current Iref is obtained as slowly rising.

Further, at that time, the waveform Y moves to "High" from "Low" so as to make the NMOS transistor 68 change to ON state from OFF state. As a result, the waveform Vcont occurs a change from an electric potential approximately being equal to the power source voltage VDD to the output electric potential of the operational amplifier 61, as shown by the drawing, the Vcont changes by dropping a voltage Vgs between gate and source of the PMOS transistor 52.

Next, when the strobe signal STB-P changes from "High" level to "Low" level, the waveform Vg slowly drops. The waveform Vg is provided to the gate terminal of the NMOS transistor 65 so as to make the resistance Rds between drain and source slowly increase about from "0" Ohm and change to a value of infinity (i.e. OFF state). The resistance Rds between drain and source of the NMOS transistor 65 and the resistance value Rref of the resistance 63 are added to decide the reference electric current Iref, as shown by the waveform of the reference electric current Iref, the reference electric current Iref slowly drops.

At that time, the waveform Y has a change to move from "High" to "Low" after a delay time Td, so that the PMOS transistor 67 in FIG. 6 moves to ON state from OFF state, and the NMOS transistor 68 changes from ON state to OFF state. As a result, the waveform Vcont occurs a change from the output electric potential of the operational amplifier 61 to an electric potential approximately being equal to the power source voltage VDD, as shown by the drawing, the Vcont changes to rise a voltage Vgs between gate and source of the PMOS transistor 52 till the electric potential approximately being equal to the power source voltage VDD.

Regarding circuit operation in the case that the strobe signal STB-P is inputted to the peripherals circuit of the LED driving and outputting circuit, moves to "High" from "Low", and moves again to "Low" from "High", it is explained again by using FIG. 6.

When the strobe signal STB-P is inputted to the trapezoid wave circuit 64 of the control voltage generating circuit 45, as shown by the waveform of Vg shown by FIG. 9, the Vg signal slowly rises. The Vg signal is provided to the gate terminal of the NMOS transistor 65 so as to make the resistance Rds between drain and source slowly decrease about from a value of infinity and drop to a value approximately approaching "0" Ohm.

Then, the resistance Rds between drain and source of the NMOS transistor 65 and the resistance value Rref of the resistance 63 are added to decide the reference electric current Iref, as shown by the waveform of the reference electric current Iref, the reference electric current Iref slowly rises. At that time, the waveform Y has a change to move from "Low" to "High", so that the PMOS transistor 67 in FIG. 6 moves to OFF state from ON state, and the NMOS transistor 68 changes from OFF state to ON state.

As a result, as shown by the waveform Vcont, the Vcont signal is switched from the electric potential approximately being equal to the power source voltage VDD to the output electric potential of the operational amplifier 61, as shown by FIG. 9, the voltage between gate and source of the PMOS transistor 52 drops from VDD to Vgs. Thereby, the reference electric current Iref rises slowly from about "0" to a predetermined electric current value.

The PMOS transistor 52, as a drive transistor of LED, has a current mirror relation with the reference electric current Iref, therefore, LED drive electric current also slowly rises from about "0" to a predetermined electric current value.

Continuously, when the strobe signal STB-P changes from "High" level to "Low" level, as shown by FIG. 9, the waveform Vg slowly drops. The Vg signal of the waveform Vg is provided to the gate terminal of the NMOS transistor 65 so as to make the resistance Rds between drain and source slowly increase about from "0" Ohm and change to a value of infinity (i.e. OFF state).

The resistance Rds between drain and source of the NMOS transistor 65 and the resistance value Rref of the resistance 63 are added to decide the reference electric current Iref, as shown by FIG. 9, a waveform of the reference electric current Iref is obtained that the reference electric current Iref slowly drops.

At that time, the waveform Y shown by FIG. 9 has a change to move from "High" to "Low" after a delay time Td, so as to make the PMOS transistor 67 move to ON state from OFF state, and make the NMOS transistor 68 change from ON state to OFF state. As a result, the Vcont signal of the waveform Vcont is switched from the output electric potential of the operational amplifier 61 to an electric potential approximately being equal to the power source voltage VDD, as shown by FIG. 9, the voltage between gate and source of the PMOS transistor 52 rises from Vgs to the electric potential approximately being equal to the power source voltage VDD. At the same time, the reference electric current Iref slowly drops from a predetermined electric current value to about "0".

Because the PMOS transistor 52, as a drive transistor of LED, has a current mirror relation with the reference electric current Iref, so the LED drive electric current also slowly drops from a predetermined electric current value to about "0". Thus, a series of operations complete that the LED drive becomes an ON state from an OFF state, and again becomes an OFF state from an ON state. Hereby, the explanation about the peripherals circuit of the LED driving and outputting circuit of the present invention and its circuit operation is finished.

Further, it is to perform a supplement explanation about that the gate length L1 of the PMOS transistor 52 is set to be longer than the gate length L2 of the PMOS transistor 53 as shown FIG. 7.

The gate length L1 of the PMOS transistor 52 is set to be equal to the gate length of the PMOS transistor 62. The PMOS transistor 52 and the PMOS transistor 62 form a current mirror circuit because their source electric potentials and gate electric potentials are respectively equal. Therefore, the drive electric current of LED (1) is kept in a scale relation with the reference electric current Iref. So it is possible to obtain drive electric current that correspond to the reference voltage Vref.

On the one hand, in the case to drive LED, it is not desirable that the drive electric current of LED changes according to the change of a regular direction voltage of LED. In order to greatly form output impedance of the drive electric current and improve its constant electric current character, the gate length L1 of the PMOS transistor 52 is set into a comparative long size. On the other hand, the PMOS transistor 53 only performs an action of switch element, it is possible to set the gate length L2 into a shortest size allowed in semiconductor manufacturing process, so that the area of the transistor becomes smaller.

Here, the gate electric potential of the PMOS transistor 52 is kept in an approximate constant electric potential, even if when switching on the drive state of LED or switching off the drive state of LED, on the gate terminal of the PMOS transistor 52, charge electric current or discharge electric current does not occur. Thus, because charge electric current or discharge electric current also does not occur on the output terminal of the operational amplifier 61, such problem does not occur that the time changes which is used for rising electric current waveform when drive is turned on according to an amount of synchronous drive dot number of LED array chip 72.

Explanation of Effect:

As explained above, in the embodiment, a drive element furnished for driving LED serves as a circuit formed from a series connection of first and second PMOS transistors, the first PMOS transistor, as a constant electric current source, has a function to decide drive electric current value of LED, the second PMOS transistor, as a switch element, has a function to shut off the constant electric current source when LED drive is turned off. Further, the movement of ON state/OFF state of the LED drive, as change of electric potential between gate and source of the first PMOS transistor, is instructed to all output terminals. Furthermore, the movement of ON state/OFF state of the second PMOS transistor is performed while the first PMOS transistor is in OFF state. As a result, in the movement of ON state/OFF state of the LED drive, charge electric current or discharge electric current caused by electric charge accumulated in parasitic capacitance does not occur. Therefore, such problem does not occur that the time changes which is used for rising or dropping electric current waveform when drive is turned on or off according to an amount of synchronous drive dot number of LED.

Further, when turning off the drive of LED, in the case that the first PMOS transistor is in OFF state and prepares to drive the drive electric current of LED, the second PMOS transistor previously is in ON state. Therefore, in the parasitic capacitance of the drain terminal of the first PMOS transistor, the accumulation of electric charge does not exist, the first PMOS transistor becomes ON state according to the movement that the drive electric current of LED becomes ON, even if the drive electric current of LED is rising, overshoot does not occur. As a result, it is possible to prevent excessive overshoot from occurring when electric current of LED rises; to prevent degradation of LED that is caused by peak electric current; and to prevent the life of LED from shortening.

Furthermore, because the movement of ON state/OFF state of the second PMOS transistor is performed while the first PMOS transistor is in OFF state, it is possible to prevent noise voltage cause by rapid drive electric current from happening when performing the movement of ON state/OFF state of the second PMOS transistor, so that error operation can be prevented in respective circuits.

Embodiment 2

In the embodiment 2, the peripherals circuit of the LED driving and outputting circuit that was explained in the above-described embodiment 1 of the present invention, is applied to a driving circuit (driver IC) which has a function to correct light amount unevenness of LED and a circuit to drive LED according to a time division. In the embodiment, there is an objective to reduce element number of whole driving circuit (driver IC). In order to realize the objective, the driving circuit (driver IC) is formed by the following structure. Regarding the technology content for reducing the element number, it will be specifically annotated in the following explanation.

First is to explain a summary of the driving circuit (driver IC) which has a function to correct light amount unevenness of LED and a circuit to drive LED according to a time division. In the explanation of the embodiment, as an example, a LED head is given that can perform a print on a paper of A4 size in a resolution of 600 dots per inch, and its concrete structure is given. In the embodiment, the total number of LED elements is 4992 (i.e. 4992 dots); in order to combining them, 26 LED arrays are arranged; each LED array includes 192 LED elements; in respective elements of each LED array, cathodes of odd-numbered LED elements are connected each other, and cathodes of even-numbered LED elements are connected each other; anodes of two LED elements that are adjoining are connected each other. The odd-numbered LED elements and the even-numbered LED elements are driven according to time division.

Figure 10:
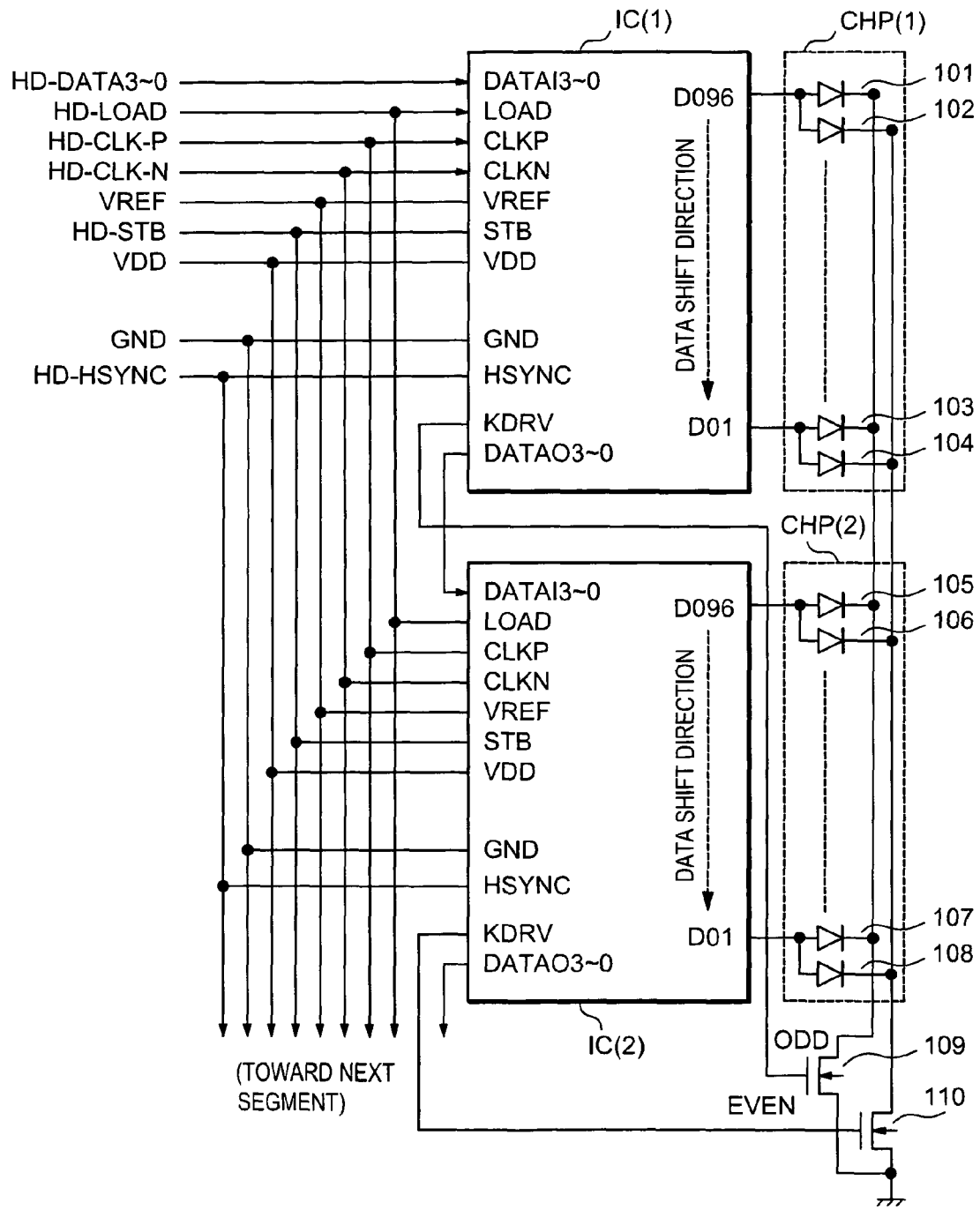
FIG. 10 is an explanation diagram of driver IC having a correcting function to correct an unevenness of light amount.

FIG. 10 is an explanation diagram of driver IC having a correcting function to correct an unevenness of light amount.

In the drawing, CHP(1) and CHP(2) are LED arrays, the representation of CHP(3)~CHP(26) is omitted. IC(1) and IC(2) are driver to correspond to the CHP(1) and CHP(2). They are formed by an identical circuit, and adjoining driver ICs are connected in cascade. Here, the representation of IC(3)~IC(26) is omitted.

As shown by FIG. 10, there are LED elements 101~108, in each LED array, 192 LED elements are furnished. Further, there are power MOS transistors 109 and 110. The drain of the power MOS transistor 109 is connected with cathode of the LED elements 101, 103, 105, 107 and the like; the drain of the power MOS transistor 110 is connected with cathode of the LED elements 102, 104, 106, 108 and the like; the sources of the power MOS transistor 109 and the power MOS transistor 110 are connected with ground.

Further, as shown by FIG. 10, the gate terminal signal of the power MOS transistor 109 is "ODD", and the gate terminal signal of the power MOS transistor 110 is "EVEN". In the structure shown by FIG. 10, there are 4 signal lines for print data signal, thus, in 8 LED elements that are adjoining, data of 4 pixels part of the odd-numbered LED elements or the even-numbered LED elements can be sent synchronously per clock signal.

Therefore, print data signal HD-DATA 3~0 outputted from the print controlling section 1 (FIG. 1) are inputted to the IC(1) and IC(2) together with the differential clock signals HD-CLK-P and HD-CLK-N, then, bit data of 4992 dots part are sequentially forwarded to a shift register circuit formed from flip-flop circuits described below.

Next, latch signal HD-LOAD is inputted to the IC(1) and IC(2), the print data signal HD-DATA 3~0 are latched by respective latch circuits furnished to correspond to the flip-flop circuits placed at inside. Continuously, according to the print data signal HD-DATA 3~0 and the strobe signal HD-STB-N, in light emitting elements (i.e. light emitting diode (LED)), only the LED element that correspond to "High" level in the print data signal HD-DATA 3~0 is turned on a light.

Moreover, VDD is a power source, GND is ground, HD-HSYNC-N is a synchronous signal for setting an initial state for LED drive of odd-numbered LED element or for LED drive of even-numbered LED element, VREF is a reference voltage for instructing a drive electric current value for LED drive and it is generated by a reference voltage generating circuit (not shown) placed inside.

Figure 11A:
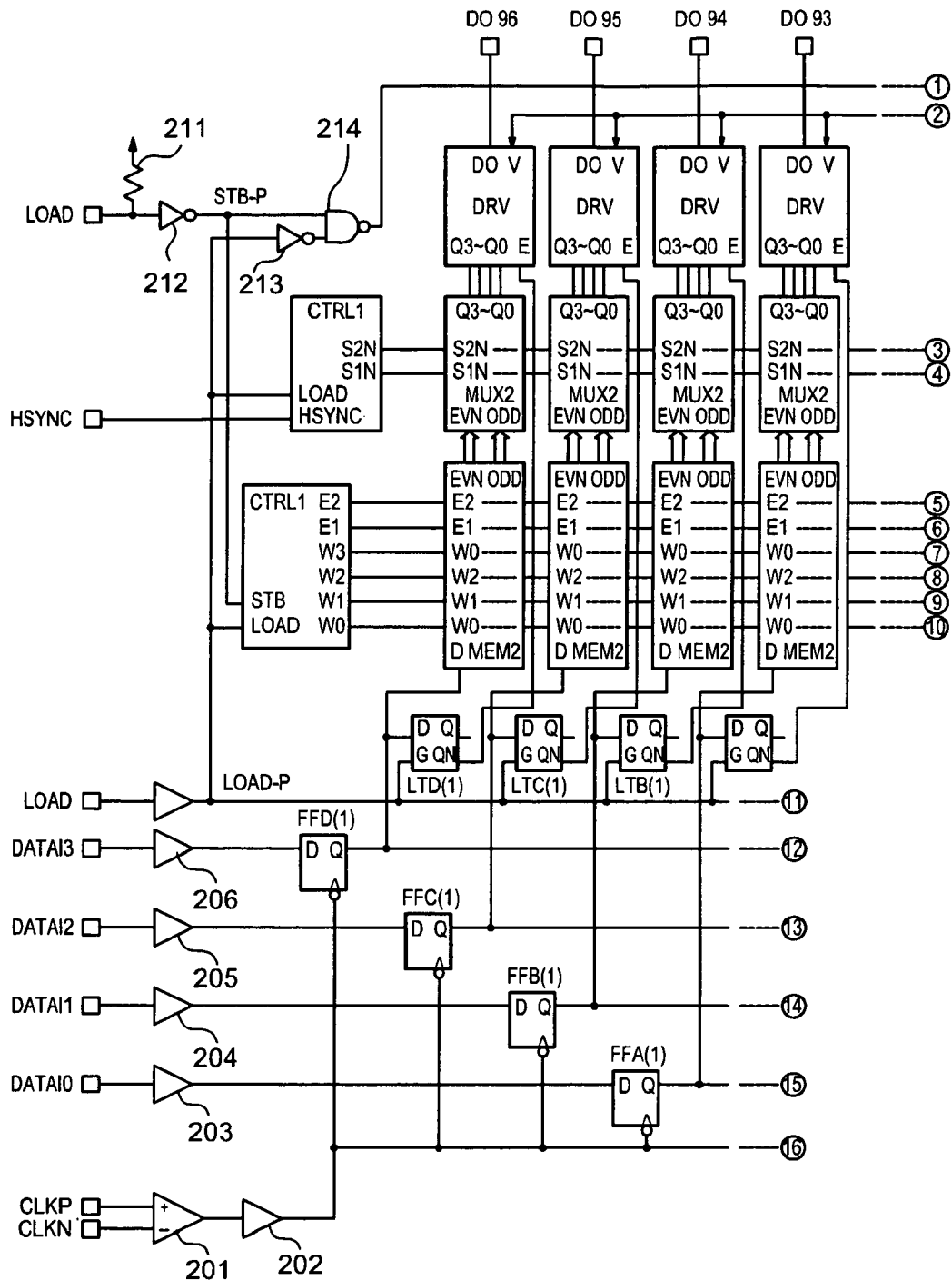
FIGS. 11A and 11B are block diagrams showing a structure of a LED head in embodiment 2.
Figure 11B:
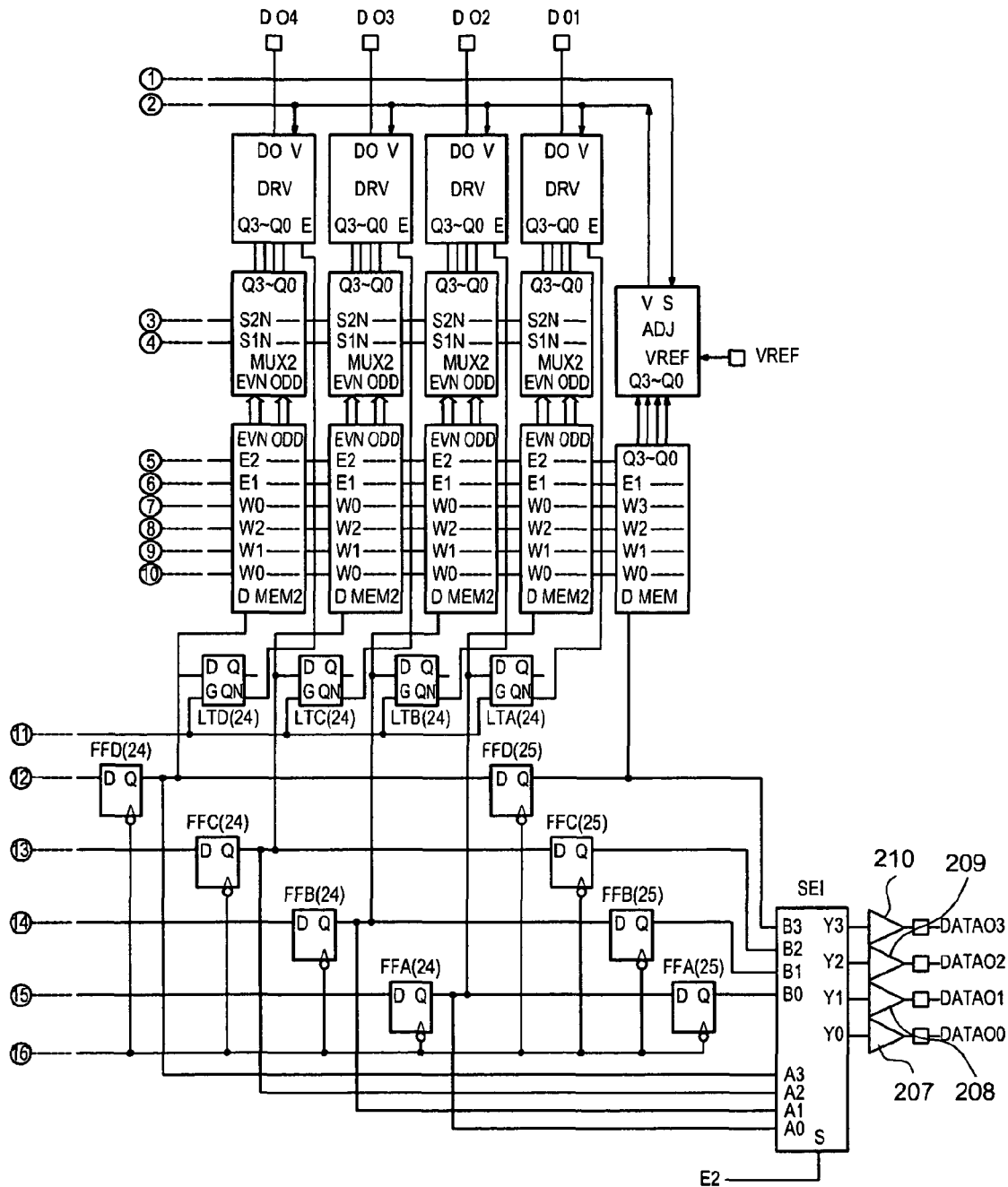

FIGS. 11A and 11B are block diagrams showing a structure of a LED head in embodiment 2;

In the drawing, the structure of the driver IC shown by FIG. 10 is shown in detail. In the structure, FFA(1)~FFA(25), FFB(1)~FFB(25), FFC(1)~FFC(25), FFD(1)~FFD(25) are flip-flop circuits, they construct shift register circuit. LTA(1)~LTD(1), . . . , LTA(24)~LTD(24) are latch elements, all of them construct a latch circuit.

MEM2 is a memory circuit, in which, correction data (dot correction data) to correct light amount unevenness of LED, light amount correction data (chip correction data) of each LED, or inherent data of each driver IC are stored.

MUX2 is a multiplexer circuit. The multiplexer circuit is furnished for performing a switch between odd-numbered dot correction data and even-numbered dot correction data with respect to dot of two adjoining LED elements according to the dot correction data outputted from the memory circuit MEM2.

DRV is a LED drive use control circuit. SEL is a selector circuit. CTRL1 is a control circuit to generate a writing instruction signal when writing correction data into the memory circuit MEM2.

Further, CTRL2 is a control circuit to send a switch signal of odd dot data and even dot data to the multiplexer circuit MUX2. ADJ is a control voltage generating circuit to receive the reference voltage VREF outputted from the VREF terminal and make a control voltage occur. The reference voltage VREF is generated by a regulator circuit (not shown), even if the power source voltage VDD occurs a drop for a moment because LED elements connected cathode are all turned on a light, the reference voltage VREF can keep in a predetermined value so that the drive electric current of the LED elements connected cathode does not drop.

201 is an input circuit of a small amplitude differential signals CLK-P and CLK-N, for converting small amplitude signal inputted to clock terminals CLKP and CLKN into logical amplitude used in IC. 202 is a buffer circuit to receive signal of the input circuit 201 and drive clock signal of the shift register circuit composed of the flip-flop circuits of FFA(1)~FFA(25), FFB(1)~FFB(25), FFC(1)~FFC(25), FFD(1)~FFD(25).

203~206 are buffer circuits. Further, 207~210 also are buffer circuits that receive output signal from SEL block to drive data output terminals DATAO 3~DATAO 0. 211 is a resistance that is a pull-up element which is connected between a strobe terminal and a power source voltage VDD. 212 and 213 are inverter circuits, 214 is a NAND circuit.

The flip-flop circuits FFA(1)~FFA(25) are connected in cascade. Data input terminal (DATAI 0) of driver IC is connected with data input terminal D of FFA(1) via the buffer circuit 203. The data outputs of the flip-flop circuit FFA(24) and the flip-flop circuit FFA(25) are inputted to the selector circuit SEL, the output terminal Y0 of the selector circuit SEL is connected with the data output terminal (DATAO 0) of driver IC via the buffer circuit 207.

Likewise, The flip-flop circuits FFB(1)~FFB(25), FFC(1)~FFC(25), FFD(1)~FFD(25) are respectively connected in cascade. Data input terminals (DATAI 1, DATAI 2, DATAI 3) of driver IC are respectively connected with data input terminals D of FFB(1), FFC(1), FFD(1) via the buffer circuits 204, 205, 206.

The data outputs of the flip-flop circuits FFB(24) and FFB(25), the flip-flop circuits FFC(24) and FFC(25), the flip-flop circuits FFD(24) and FFD(25) are respectively inputted to the selector circuit SEL, the output terminals Y1, Y2, Y3 of the selector circuit SEL are respectively connected with the data output terminals (DATAO 1, DATAO 2, DATAO 3) of driver IC via the buffer circuits 208~210.

Therefore, the flip-flop circuits of FFA(1)~FFA(25), FFB(1)~FFB(25), FFC(1)~FFC(25), FFD(1)~FFD(25) construct 25 a shift register circuit of 25 segments, through the selector circuit SEL, it is possible to switch the shift segment number of the shift register circuit according to 24 segments or 25 segments The data output terminals (DATAO 0, DATAO 1, DATAO 2, DATAO 3) of driver IC are connected with the data input terminals (DATAI 0, DATAI 1, DATAI 2, DATAI 3) of driver IC of next segment. Therefore, the shift register circuit composed of all of the driver IC(1)~driver IC(26) may be a shift register circuit of 24×26 segments or a shift register circuit of 25×26 segments to shift the print data signal HD-DATA3 that is inputted to the first segment from the print controlling section 1 (FIG. 1), synchronously with clock signal.

In the NAND circuit 214, strobe signal HD-STB-N corresponding to terminal (STB) and latch signal LOAD-P corresponding to terminal (LOAD) are inputted via the inverter circuits 212 and 213, so that signal is generated to control ON or OFF of drive for the LED drive use circuit DRV.

Next, it is to sequentially explain in detail the memory circuit MEM2, the multiplexer circuit MUX2, the LED drive use circuit DRV, the control voltage generating circuit ADJ, the control circuit CTRL1, the control circuit CTRL2 through using respective circuit drawings.

Figure 12:
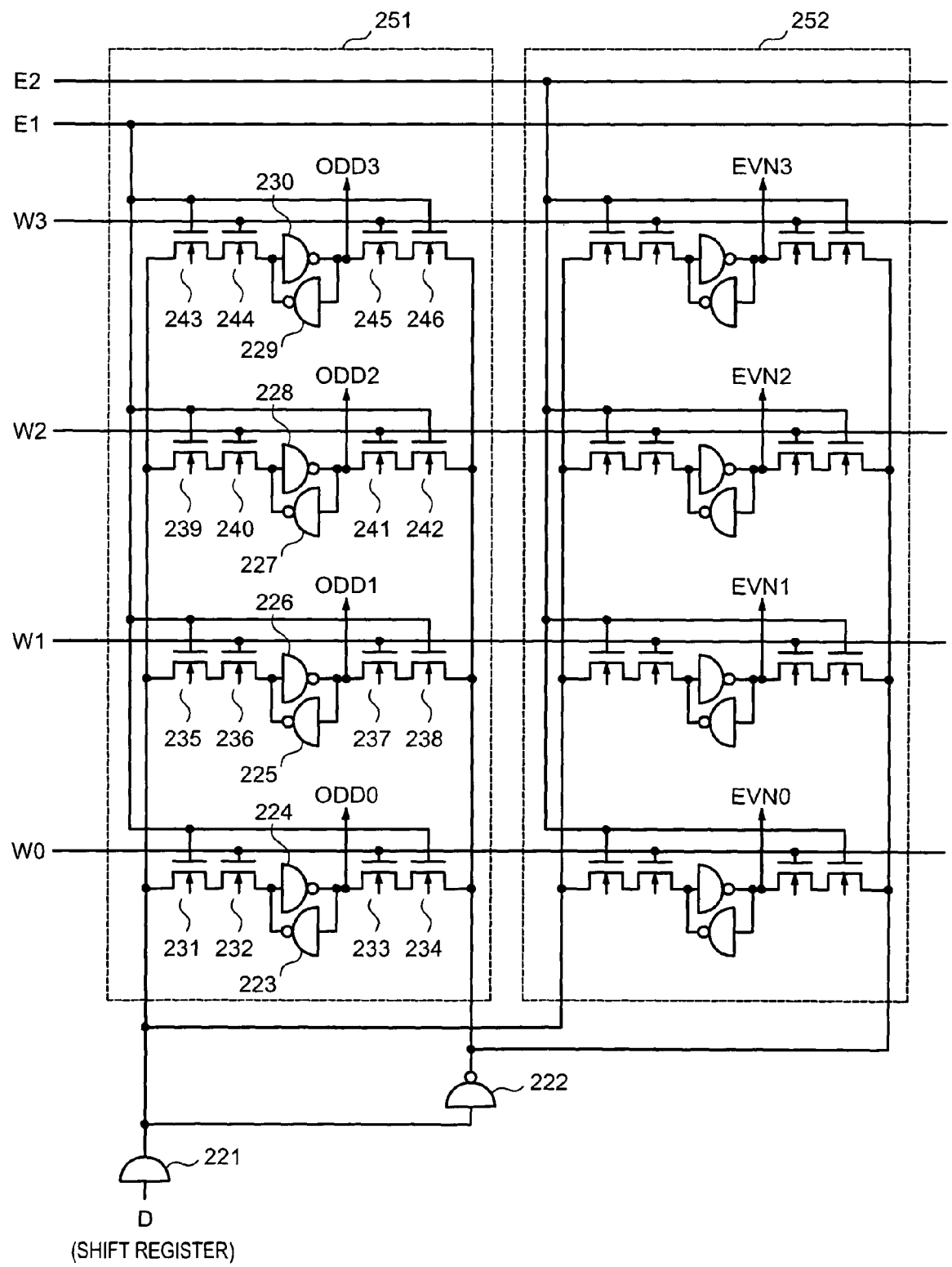
FIG. 12 is a diagram showing a circuit structure of a memory circuit MEM2.

FIG. 12 is a diagram showing a circuit structure of a memory circuit MEM2.

In the embodiment, dot correction data for correcting LED light amount has 4 bits so as to perform a light amount correction through adjusting LED drive electric current in 16 segments per dot.

As shown by FIG. 12, there are adjoining two (two dots) memory cells, they are divided to be respectively shown by areas 252 and 252 represented by broken line. The area 251 stores correction data of odd-numbered dot (e.g. dot No. 1), the area 252 stores correction data of even-numbered dot (e.g. dot No. 2).

The memory circuit MEM2 includes a buffer circuit 221, an inverter 222 for generating data signal that is assistant with the buffer circuit 221, inverters 223~230 to construct correction memory cell, and NMOS transistors 231~246.

Further, the memory circuit MEM2 has a correction data input terminal D, an enabling terminal E1 to receive an enabling signal E1 for allowing a data writing on the side of odd-numbered dot, an enabling terminal E2 to receive an enabling signal E2 for allowing a data writing on the side of even-numbered dot, memory cell selection terminals W0~W3, correction data output terminal ODD0~ODD3 concerning the odd-numbered dot, and correction data output terminal EVN0~EVN3 concerning the even-numbered dot.

The correction data input terminal D is respectively connected with data output terminals Q of flip-flop circuits FFA (1), FFB(1), FFC(1), FFD(1), FFA(2), ..., FFA(24), FFB (24), FFC(24), FFD(24) and the like shown by FIGS. 11A-11B. Further, the writing control signal W0~W3 outputted from the control circuit CTRL1 are inputted into the memory cell selection terminals W0~W3, writing-enabling signal E1 and writing-enabling signal E2 outputted from the control circuit CTRL1 are inputted into the enabling terminal E1 and the enabling terminal E2.

The correction data input terminal D of the buffer circuit 221 is an input terminal of correction data; an output terminal of the buffer circuit 221 is connected with first terminals of the NMOS transistors 231, 235, 239, 243. An input terminal of the inverter 222 is connected with the output of the buffer circuit 221; an output terminal of the inverter 222 is connected with first terminals of the NMOS transistors 234, 238, 242, 246.

The inverters 223 and 224, the inverters 225 and 226, the inverters 227 and 228 and the inverters 229 and 230 are respectively connected in series to form respective memory cells. The NMOS transistors 231 and 232, the NMOS transistors 233 and 234, the NMOS transistors 235 and 236, the NMOS transistors 237 and 238, the NMOS transistors 239 and 240, the NMOS transistors 241 and 242, the NMOS transistors 243 and 244 and the NMOS transistors 245 and 246 are respectively connected in series, one end of each series connection is connected with the output of the buffer circuit 221 or the inverter 222.

The gate terminals of the NMOS transistors 232 and 233 are connected with the terminal W0, the gate terminals of the NMOS transistors 236 and 237 are connected with the terminal W1, the gate terminals of the NMOS transistors 240 and 241 are connected with the terminal W2, the gate terminals of the NMOS transistors 244 and 245 are connected with the terminal W3. Further, the enabling terminal E1 is connected with the gate terminals the NMOS transistors 231, 234, 235, 238, 239, 242, 243, 246.

The output terminal of the inverter 224 is connected with the terminal ODD0. The output terminal of the inverter 226 is connected with the terminal ODD1. The output terminal of the inverter 228 is connected with the terminal ODD2. The output terminal of the inverter 230 is connected with the terminal ODD3. The above description relates to the memory cell 251, but the memory cell 252 almost has the same structure as the memory cell 252, except the enabling signal is called "E2", and outputted signal name is called "EVN0~EVN3".

Figure 13:
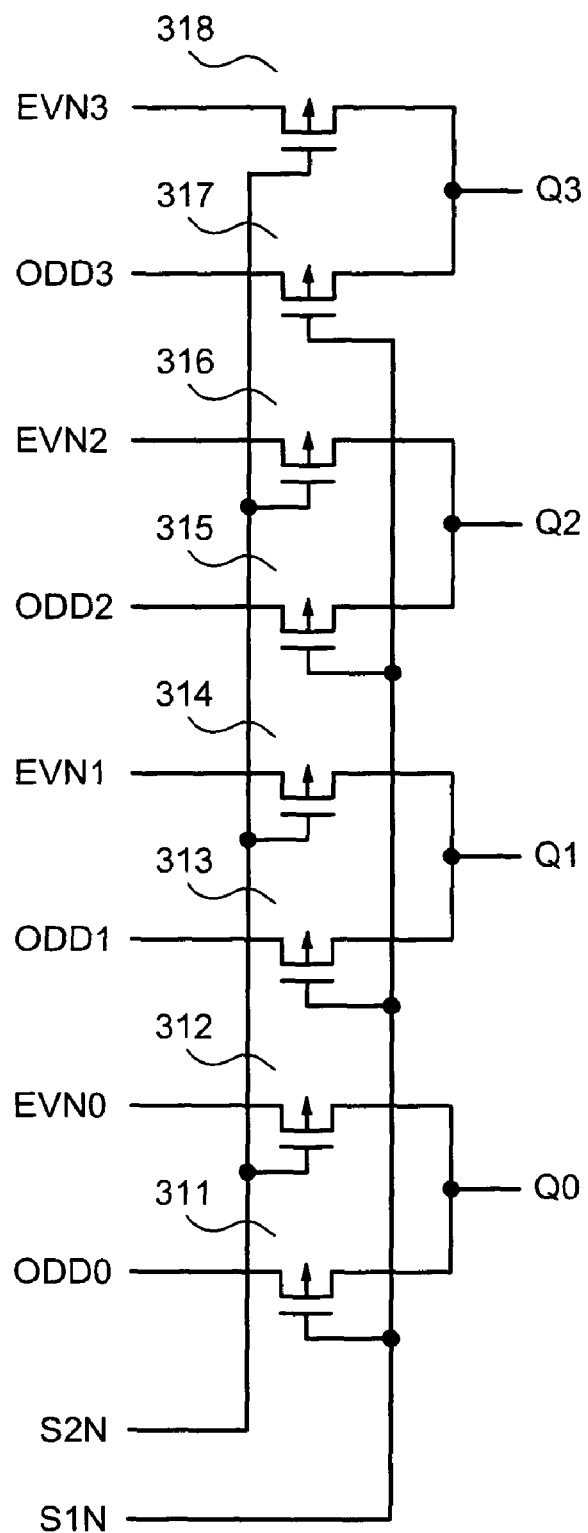
FIG. 13 is a diagram showing a circuit structure of a multiplexer circuit MUX2.

FIG. 13 is a diagram showing a circuit structure of a multiplexer circuit MUX2.

As shown by FIG. 13, the multiplexer circuit MUX2 is composed of 4 independent multiplexer circuits. There are PMOS transistors 311~318. The gates of the PMOS transistors 311, 313, 315, 317 are connected with a terminal SiN; the gates of the PMOS transistors 312, 314, 316, 318 are connected with a terminal S2N; the first terminal of the PMOS transistor 311 is connected with the terminal ODD0, and the first terminal of the PMOS transistor 312 is connected with the terminal EVN0; the second terminals of the PMOS transistors 311 and 312 are connected with the terminal Q0.

The PMOS transistors 313~318 has the same connection structure, that is, the first terminal of the PMOS transistor 313 is connected with the terminal ODD1, the first terminal of the PMOS transistor 314 is connected with the terminal EVN1, and the second terminals of the PMOS transistors 313 and 314 are connected with the terminal Q1. Further, the first terminal of the PMOS transistor 315 is connected with the terminal ODD2, the first terminal of the PMOS transistor 316 is connected with the terminal EVN2, and the second terminals of the PMOS transistors 315 and 316 are connected with the terminal Q2. Furthermore, the first terminal of the PMOS transistor 317 is connected with the terminal ODD3, the first terminal of the PMOS transistor 318 is connected with the terminal EVN3, and the second terminals of the PMOS transistors 317 and 318 are connected with the terminal Q3.

The multiplexer circuit adopts a structure capable of reducing element number and preventing hindrance on operation. In the structure, the PMOS transistor is used as switch element, the reason is explained below.

That is, when making signal SiN become "Low" level so as to turn on the PMOS transistor 311, if the signal ODD0 is "High" level, a voltage being approximately equal to the "High" level is outputted to the terminal Q0. Thus, because of such transfer of "High" level, the PMOS transistor can be used as switch element without any hindrance.

Likewise, when the signal ODD0 is in "Low" level (about 0V), the second terminal of the PMOS transistor 311 does not drop till an electric potential approaching a threshold value of the transistor, that is, till "Low" level (about 0V). Therefore, the transfer function of "Low" level is not complete so that there is a weak point.

In order to eliminate the weak point, in conventional technology, an analog switch is formed as a switch means for data selection through connecting PMOS transistor and NMOS transistor in parallel. In such structure, it is possible to obtain an output electric potential being approximately equal to an input signal electric potential which is prepared to transfer, and a difference between input electric potential and output electric potential does no occur through the switch means intervenes. However, with respect to one data signal line, it is necessary to provide a pair of PMOS transistor and NMOS transistor, as compared with the embodiment, 2 times the element is needed, so there is a problem that chip area of IC more possesses for placing these elements.

With respect to such problem, in the structure of the embodiment, as compared with such circuit using conventional analog switch, though only a half of elements are used, a weak point exists that transfer function of "Low" level is not complete. However, in the LED drive use circuit DRV (described below) of the embodiment, input voltage needs to be approximately equal to VDD electric potential, as "High" level; but, because such "Low" level as about "0" is not needed, so it is sufficient to drop till Vcont electric potential (described below), as "Low" level. Therefore, it is possible to adopt such multiplexer circuit only using PMOS transistor, and circuit operation can be performed without any hindrance. The following is to explain the LED drive use circuit DRV in detail.

Figure 14:
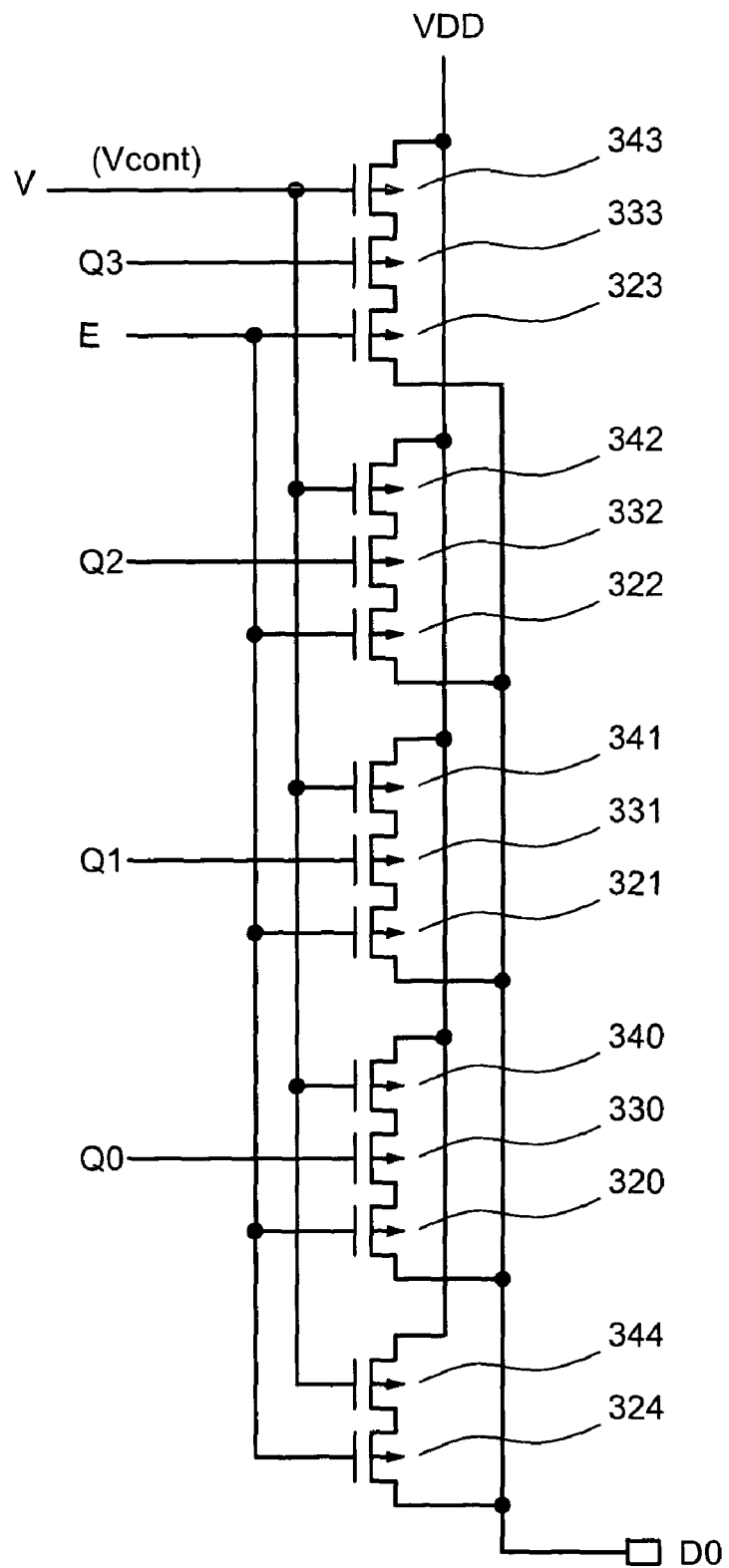
FIG. 14 is a diagram showing a circuit structure of a LED drive use circuit DRV in embodiment 2.

FIG. 14 is a diagram showing a circuit structure of a LED drive use circuit DRV in embodiment 2.

As shown by FIG. 14, the LED drive use circuit DRV in embodiment 2 includes PMOS transistors 320~324, 330~333, 340~344. The gate lengths of the PMOS transistors 340~344 are set to be equal to that of the PMOS transistor 62 shown by FIG. 6.

The gate widths of the PMOS transistors 340~343 are set so that their size ratio is 1:2:4:8 according to bit weights of correction data (bit 0~bit 3) outputted from the memory circuit MEM2. Further, the LED drive use circuit DRV has a print data input terminal E (negative logic), an input terminal V, correction data input terminals Q0~Q3 (negative logic), and a drive electric current output terminal DO.

The QN outputs of the latch circuits LTA(1)~LTD(1), LTA(12)~LTD(12) are connected to the print data input terminal E. The correction data input terminals Q3~Q0 are connected with the correction data output terminals terminal Q3~Q0 of the multiplexer circuit MUX2 shown by FIGS. 11A-11B. The input signals Q3~Q0 are correction data to correct light amount unevenness of LED element per dot.

To the input terminal V, the control voltage Vcont outputted from the control voltage generating circuit ADJ is inputted. The control voltage generating circuit ADJ has the same structure as that in embodiment 1, it is formed by using the control voltage generating circuit ADJ 45 of FIG. 6. The drive electric current output terminal DO is an output terminal of driver IC, and is connected with anode of LED element by bonding wire (not shown).

The source terminals of the PMOS transistors 340~344 are connected with power source VDD, the drain terminals of the PMOS transistors 320~324 are connected with the drive electric current output terminal DO. An electric potential difference between the power source VDD and the control voltage Vcont is approximately equal to an voltage between gate and source when the PMOS transistors 340~344 turn on, through changing the voltage, the drain electric current of the PMOS transistors 340~344 can be adjusted.

The control voltage generating circuit ADJ is furnished for receiving a reference voltage Vref (not shown) and controlling the control voltage Vcont so that the drain electric current of the PMOS transistors 340~344 and the like becomes a predetermined value.

The PMOS transistors 340, 330 and 320; the PMOS transistors 341, 331 and 321; the PMOS transistors 342, 332 and 322; and the PMOS transistors 343, 333 and 323 are respectively connected through connecting drain terminal with source terminal. Likewise, the PMOS transistors 344 and 324 are connected by connecting drain terminal with source terminal.

The PMOS transistor 344 is a main drive transistor to mainly supply drive electric current to LED element, the PMOS transistors 340~343 are subsidiary drive transistors to adjust the drive electric current of LED so as to correct light amount.

The PMOS transistor 344 (main drive transistor) is driven according to print data. The PMOS transistors 340~343 (subsidiary drive transistors) are selectively driven according to the multiplexer output signals Q0~Q3. As described above, from the terminals Q0~Q3 of multiplexer, data of correction memory are outputted, in the correction memory, correction data is stored for correcting unevenness of light emitting amount of each LED dot.

That is, with the PMOS transistor 344 (main drive transistor), the PMOS transistors 340~343 (subsidiary drive transistors) are selectively driven according to the correction data, then, the drain electric current of the PMOS transistor 344 (main drive transistor) and the drain electric current of the selected one of the PMOS transistors 340~343 (subsidiary drive transistors) are added to form a drive electric current, the drive electric current is outputted from the drive electric current output terminal DO to drive LED.

In the above explanation, there is an attention point. That is, as explained previously, the output of the multiplexer circuit MUX2 needs an input voltage that is approximately equal to the power source VDD with respect to "High" level, but does not need to drop electric potential till about "0" voltage with respect to "Low" level. However, as stated above, the PMOS transistors 340, 330 and 320; the PMOS transistors 341, 331 and 321; the PMOS transistors 342, 332 and 322; and the PMOS transistors 343, 333 and 323 are respectively connected through connecting drain terminal with source terminal; and the PMOS transistors 344 and 324 are connected by connecting drain terminal with source terminal. Thereby, the "Low" level is sufficient to drop to Vcont electric potential, such "Low" level as about "0" is not necessary. Therefore, as shown by FIG. 13, it is possible to adopt such multiplexer circuit only using PMOS transistor, and circuit operation is performed without any hindrance.

The following is to explain again the LED drive use circuit DRV.

As stated above, in the LED drive use circuit DRV, the gate widths of the PMOS transistors 340~343 are set so that their size ratio is 1:2:4:8, and the correction memory for setting drive on or drive off of these transistors is set by 4 bits. Therefore, the LED drive electric current also has a setting value of 4 bits. Through performs respective combinations, with respect to the setting value, the LED drive electric current can be adjusted to 16 segments. Here, it is to explain the structure of drive transistor.

Figure 15:
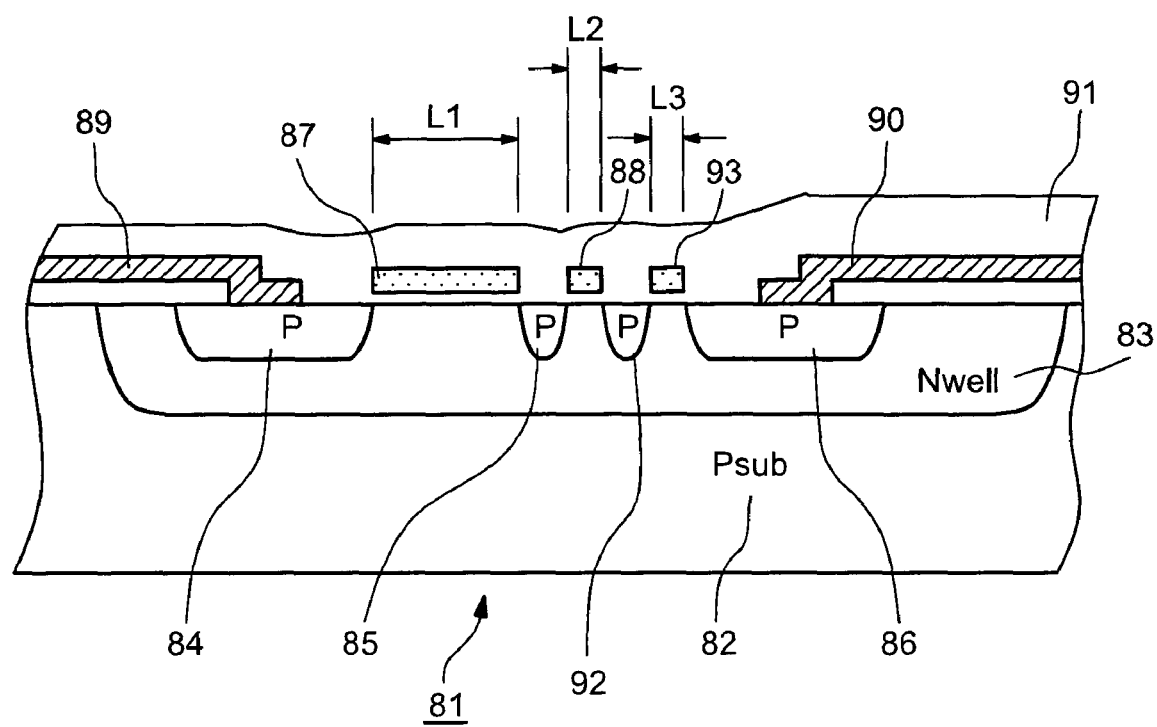
FIG. 15 is a cross section of a drive transistor in embodiment 2.

FIG. 15 is a cross section of a drive transistor in embodiment 2.

In the drawing, structures of the PMOS transistors 340, 330 and 320; the PMOS transistors 341, 331 and 321; the PMOS transistors 342, 332 and 322; the PMOS transistors 343, 333 and 323, or the like are shown. This is a cross section obtained along a direction which is orthogonal with wirings of source, gate and drain of the drive transistor.

In the drawing, there are an IC chip 81, a P type region 82 which represents a substrate layer, a N type well region 83 formed in the P type region 82, and P type regions 84~86 formed in the N type well region 83. Further, there are gate wirings 87, 88, 93, the wiring 87 corresponds to the gate of the PMOS transistor (e.g. 343) in FIG. 14, the wiring 88 corresponds to the gate of the PMOS transistor (e.g. 333) in FIG. 14, the wiring 93 corresponds to the gate of the PMOS transistor (e.g. 323) in FIG. 14, their gate lengths respectively are "L1" "L2" and "L3" as shown by FIG. 15.

Moreover, there are a metal wiring 89 which is connected with the P type region 84 (e.g. corresponding to the source terminal of the PMOS transistor 343) and with the power source voltage VDD (not shown).

Furthermore, there are a metal wiring 90 which is connected with the P type region 86 (e.g. corresponding to the drain terminal of the PMOS transistor 323) and with a drive output terminal (not shown); and a protective film 91 covering on the upper surface of the IC chip 81.

As shown by FIG. 15, the gate lengths of the PMOS transistors (e.g. 340, 330, 320) of FIG. 14 respectively are "L1" "L2" and "L3", they are set into: L1>L2, L2=L3.

The gate length of the PMOS transistor 340 is set to be equal to the gate length of the PMOS transistor 62 (FIG. 6). The PMOS transistor 340 and the PMOS transistor 62 form a current mirror circuit because their source electric potentials and gate electric potentials are respectively equal. Therefore, the drive electric current of LED (1) is kept in a scale relation with the reference electric current Iref. So it is possible to obtain drive electric current that correspond to the reference voltage Vref.

On the one hand, in the case to drive LED, it is not desirable that the drive electric current of LED changes according to the change of a regular direction voltage of LED. In order to greatly form output impedance of the drive electric current to improve its constant electric current character, the gate length of the PMOS transistor 344 or 340~343 (FIG. 14) is set into a comparative long size.

On the other hand, the PMOS transistors 330, 320 (FIG. 14) or the like only performs an action of switch element, it is possible to set the gate length of the PMOS transistors 330, 320 (FIG. 14) or the like into a shortest size allowed in semiconductor manufacturing process, so that the area of the transistor can become smaller.

Figure 16:
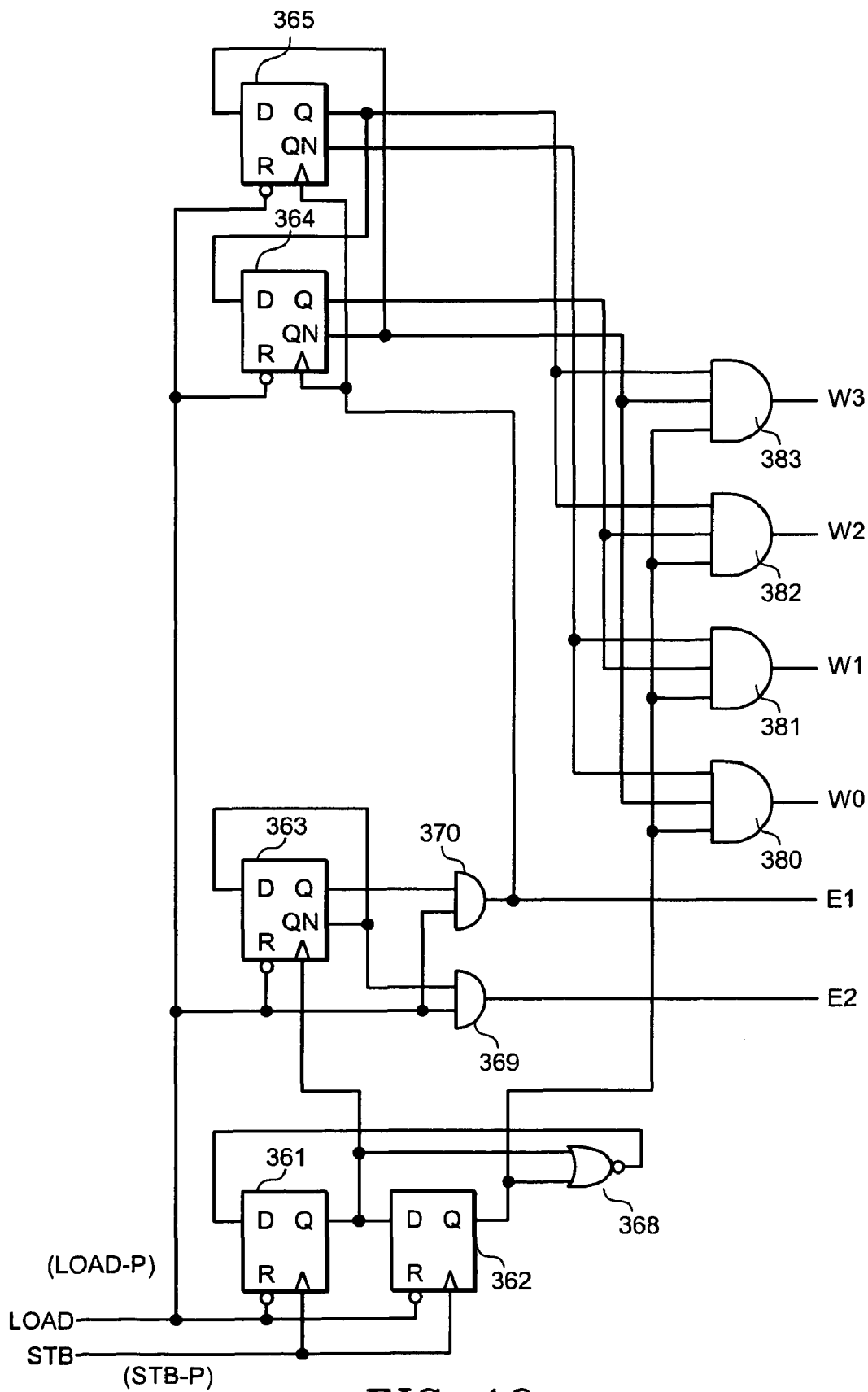
FIG. 16 is a diagram showing a circuit structure of a controlling circuit CTRL1.

FIG. 16 is a diagram showing a circuit structure of a controlling circuit CTRL1.

In the FIG. 16, 361~365 are flip-flop circuits. 368 is a NOR circuit. 369, 370 are AND circuit. 380~383 are AND circuit. The negative logic resetting terminals of the flip-flop circuits 361~365 are connected with a terminal LOAD to input latch signal LOAD-P. The clock terminals of the of the flip-flop circuits 361~362 are connected with a terminal STB to input STB-P signal.

The output Q of the flip-flop circuits 361~362 are connected with an input of the NOR circuit 368, an output of the NOR circuit 368 is connected with the input D of the flip-flop circuit 361. The clock terminal of the flip-flop circuit 363 is connected with the output terminal Q of the flip-flop circuit 361. In the flip-flop circuit 363, the output QN is connected with the input terminal D.

The output Q of the flip-flop circuit 363 is connected with one input terminal of the AND circuit 370, the output terminal QN of the flip-flop circuit 363 is connected with one input terminal of the AND circuit 369, another input terminals of the AND circuit 369 and the AND circuit 370 are connected with the terminal LOAD to input the LOAD-P signal.

Further, the outputs of the AND circuit 370 and the AND circuit 369 are respectively connected with the terminal E1 and the terminal E2, they are writing enabling signals of the memory circuit MEM2 shown by FIGS. 11A-11B. The clock terminals of the flip-flop circuit 364 and the flip-flop circuit 365 are connected with the output of the AND circuit 370, the terminal D of the flip-flop circuit 364 is connected with the output terminal Q of the flip-flop circuit 365, the input terminal D of the flip-flop circuit 365 is connected with the output terminal QN of the flip-flop circuit 364.

A first input of the AND circuit 383 is connected with the terminal Q of the flip-flop circuit 365, a second input of the AND circuit 383 is connected with the terminal QN of the flip-flop circuit 364. A first input of the AND circuit 382 is connected with the terminal Q of the flip-flop circuit 365, a second input of the AND circuit 382 is connected with the terminal Q of the flip-flop circuit 364. A first input of the AND circuit 381 is connected with the terminal QN of the flip-flop circuit 365, a second input of the AND circuit 381 is connected with the terminal Q of the flip-flop circuit 364. A first input of the AND circuit 380 is connected with the terminal QN of the flip-flop circuit 365, a second input of the AND circuit 380 is connected with the terminal QN of the flip-flop circuit 364.

Third inputs of the AND circuit 380~383 are connected with the output Q of the flip-flop circuit 362. Output terminals of the AND circuit 380~383 are respectively connected with the terminals W0~w3, they are writing instruction signals toward the memory circuit MEM2 shown by FIGS. 11A-11B.

Figure 17:
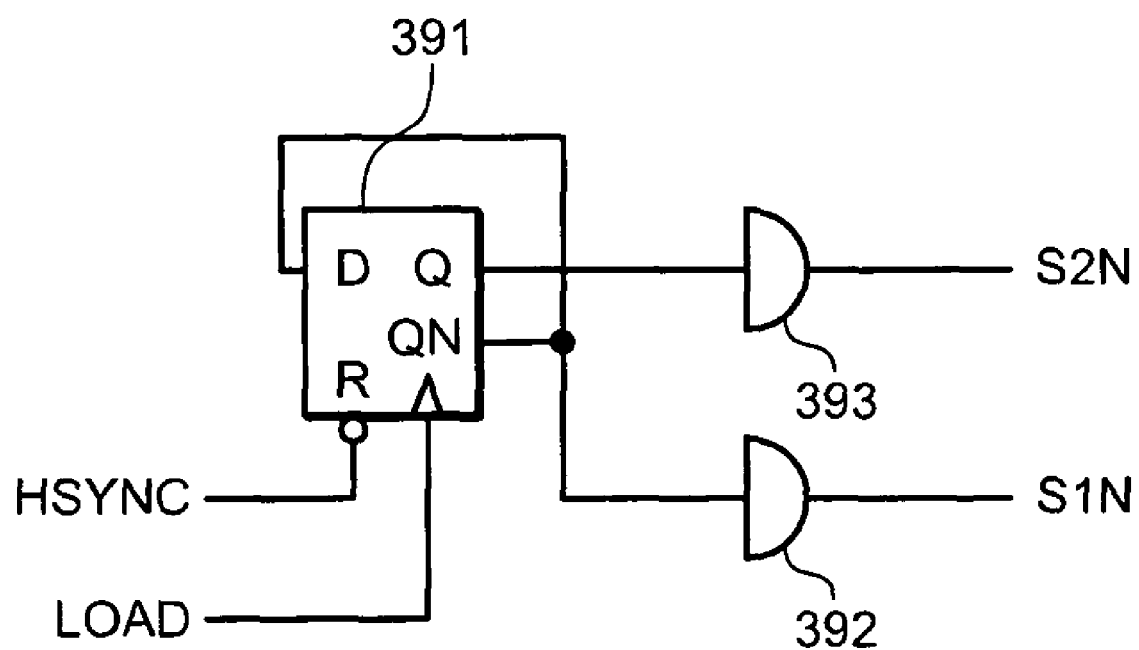
FIG. 17 is a diagram showing a circuit structure of a controlling circuit CTRL2.

FIG. 17 is a diagram showing a circuit structure of a controlling circuit CTRL2.

In the drawing, 391 is a flip-flop circuit. 392 and 393 are buffer circuits. The clock terminal of the flip-flop circuit 391 is connected with a terminal LOAD to inputs LOAD-P signal, the negative logic resetting terminal R of the flip-flop circuit 391 is connected with a terminal HSYNC to inputs HSYNC-N signal, the terminal D of the flip-flop circuit 391 is connected with the terminal QN of itself. The input terminal of the buffer circuit 393 is connected with the terminal Q of the flip-flop circuit 391. The output terminals of the buffer circuit 392 and the buffer circuit 393 are respectively connected with the terminals S1N, S2N, they are outputted to the multiplexer circuit MUX2 of FIGS. 11A-11B as data selection instruction signals.

The LED head explained above in the embodiment 2 performs the following operation.

Figure 18:
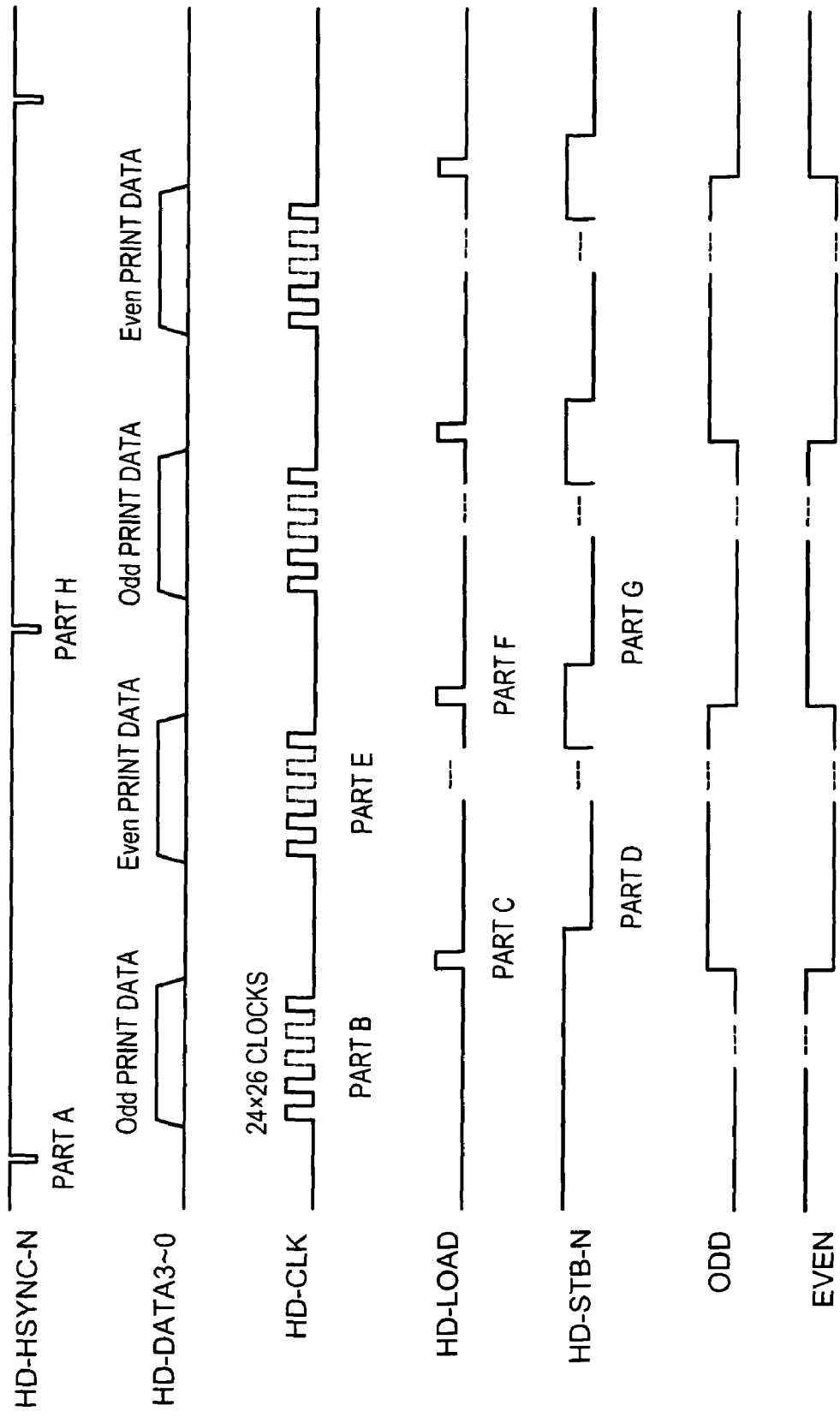
FIG. 18 is a timing chart of control signal in embodiment 2.

FIG. 18 is a timing chart of control signal in embodiment 2.

In the drawing, according to an order from top to bottom, a synchronous signal HD-HSYNC-N, a print data signal HD-DATA, a clock signal HD-CLK, an latch signal HD-LOAD, a strobe signal HD-STB-N, ODD selection data and EVEN selection data are indicated.

Before a start of time division drive of LED, the synchronous signal HD-HSYNC-N is inputted (part A). Next, in part B, in order to forward odd-numbered LED drive data (Odd print data), the print data signal HD-DATA 3~0 are inputted synchronously with the clock signal HD-CLK. Moreover, in the LED head, 26 driver ICs are connected in cascade, each driver IC has 96 LED drive terminals, 4 pixels part of print data is once forwarded according to clock signal of one pulse.

Thus, the number of the clock pulse that is necessary for one data forwarding is 96/4×26=24×26=624.

After the data forwarding of odd-numbered dot of one line data is ended in the part B, the latch signal HD-LOAD is inputted as shown by part C, the data that is inputted via a shift register circuit composed of the flip-flop circuits (FFA(1)~FFD(25)) is latched by the latch circuits (LTA(1)~LTD(24)). Then, the strobe signal HD-STB-N is inputted for instructing LED drive (part D).

Further, before that, control signals ODD, EVEN of MOS transistors (i.e. power MOS transistors 109, 110 in FIG. 10) to switch on or off a connection toward ground of the common cathode terminal of LED are outputted from terminal KDRV (not shown in FIG. 10) of IC(1), IC(2) of FIG. 10.

These signals are generated by control circuit (not shown) inside driver IC. Through ODD/EVEN selection instruction data stored in a memory circuit (not shown) that is the same as the memory circuit MEM2, one of control signal ODD and control signal EVEN is selected, and is outputted from the terminal KDRV.

The control signal ODD is selected from the IC(1) in FIG. 10 and is outputted from the terminal KDRV to drive gate terminal of the power MOS transistor 109; the control signal EVEN is selected from the IC(2) in FIG. 10 and is outputted from the terminal KDRV to drive gate terminal of the power MOS transistor 110. In FIG. 10, because corresponding MOS transistors are not provided to the terminals KDRV (not shown) of the IC(3)~IC(26), these terminals KDRV are opened.

In FIG. 10, when the control signal ODD is "High" level and the control signal EVEN is "Low" level, the power MOS transistor 109 turns on and the power MOS transistor 110 turns off, a flow path is formed from cathode terminal of LED elements 101, 103, 105, 107 to ground.

At that time, the power MOS transistor 110 is in OFF state and a flow path is not formed from cathode terminal of LED elements 102, 104, 106, 108 to ground. Therefore, in the case that LED drive electric current flows out from the terminal DO1 of the driver IC (1), an electric current path is formed to flow through the anode terminal and the cathode terminal of the LED element 101 and through the drain and the source of the power MOS transistor 109, then reach the ground. At that time, the LED element 101 emits light to form an electrostatic latent image onto a photosensitive drum (not shown) so as to generate print dot.

In the case, because electric current path is not formed in the LED element 102, there is no any hindrance for the light emitting state of the LED element (101).

The following is to explain again according to FIG. 18.

In part E, in order to forward even-numbered LED drive data (Even print data), the print data signal HD-DATA 3~0 are inputted synchronously with the clock signal HD-CLK.

Moreover, in the LED head, 26 driver ICs are connected in cascade, each driver IC has 96 LED drive terminals, 4 pixels part of print data is once forwarded according to clock signal of one pulse. Thus, the number of the clock pulse that is necessary for one data forwarding is 96/4×26=24×26=624.

After the data forwarding of even-numbered dot of one line data is ended in the part E, the latch signal HD-LOAD is inputted as shown by part F, the data that is inputted via the shift register circuit is latched by the latch circuits (LTA(1)~LTD(24)). Then, the strobe signal HD-STB-N is inputted for instructing LED drive (part G).

Further, before that, control signals ODD, EVEN of MOS transistors (i.e. power MOS transistors 109, 110 in FIG. 10) to switch on or off a connection toward ground of the common cathode terminal of LED are inputted.

In FIG. 10, when the control signal EVEN is "High" level and the control signal ODD is "Low" level, the power MOS transistor 110 turns on and the power MOS transistor 109 turns off, a flow path is formed from cathode terminal of LED elements 102, 104, 106, 108 to ground.

At that time, a flow path is not formed from cathode terminal of LED elements 101, 103, 105, 107 to ground. Therefore, in the case that LED drive electric current flows out from the terminal DO1 of the driver IC (1), an electric current path is formed to flow through the anode terminal and the cathode terminal of the LED element 102 and through the drain and the source of the power MOS transistor 110, then reach the ground. At that time, the LED element 102 emits light to form an electrostatic latent image onto a photosensitive drum (not shown) so as to generate print dot.

In the case, because electricity path is not formed in the LED element 101, there is no any hindrance for the light emitting state of the LED element (102).

Thus, it is possible to perform LED drive of one line part through driving the odd-numbered LED element and the even-numbered LED element in LED elements according to an order, in a time division way.

Figure 19:
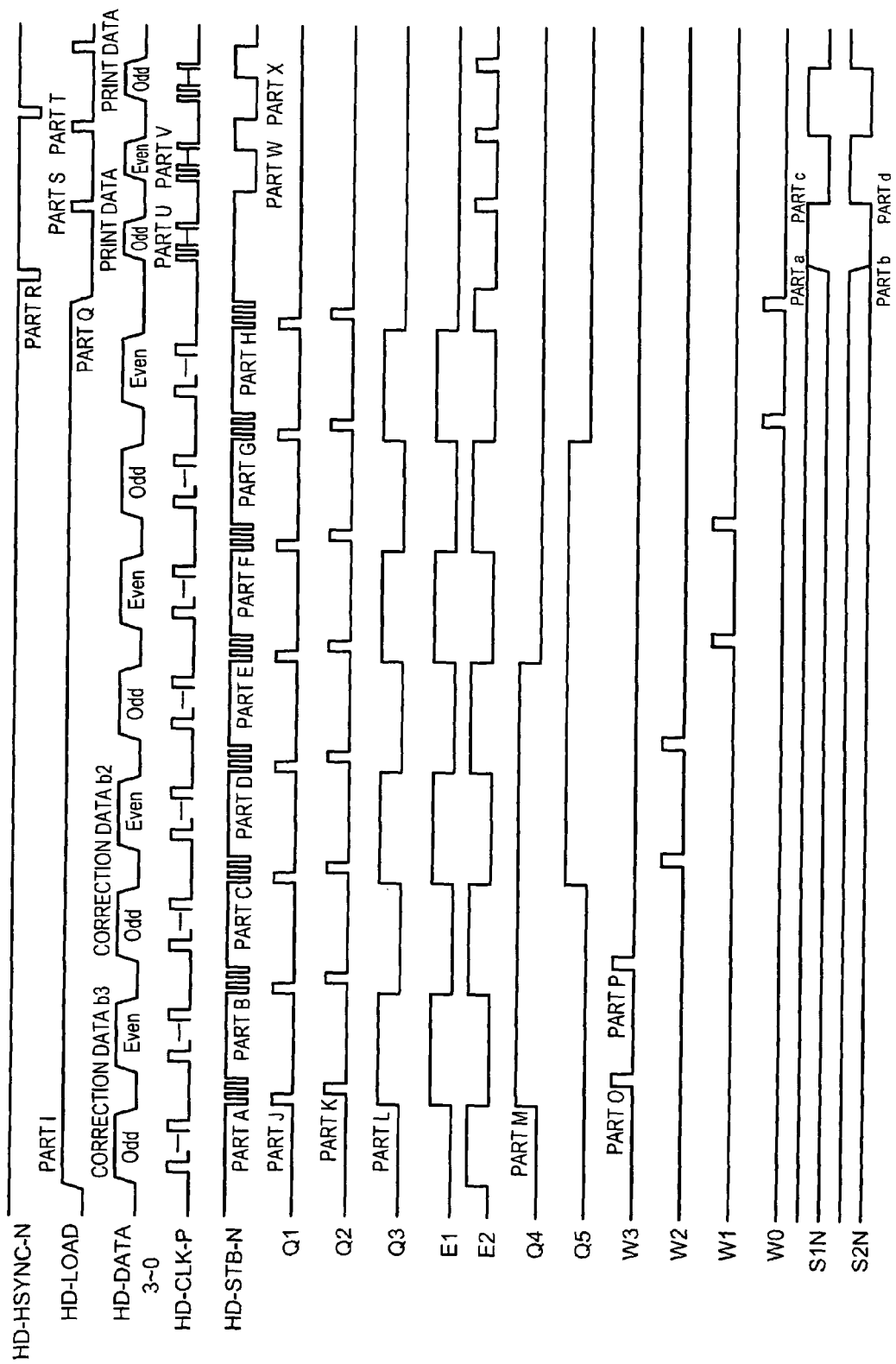
FIG. 19 is a timing chart of whole operation of embodiment 2.

FIG. 19 is a timing chart of whole operation of embodiment 2.

The drawing relates to a correction data forwarding process with respect to the LED head of the present invention when power source of printer is turned on; and a print data forwarding after the correction data forwarding process.

Before a forwarding start of correction data, the latch signal HD-LOAD is set into "High" level (part I).

Next, regarding the odd-numbered dot, in correction data composed of 4 bits per one dot, the dada of bit 3 is inputted synchronously with the clock signal HD-CLK, from the print data signal HD-DATA 3~0, and is shifted to the shift register circuit formed by the flip-flop circuits (FFA(1)~FFD(24)) of FIGS. 11A-11B.

After shift input is ended, as shown by part A, the strobe signal HD-STB-N of 3 pulses is inputted, operation of circuit shown by FIG. 16 is performed. In drawing, the Q1 and the Q2 are the outputs Q of the flip-flop circuits 361 and 362, likewise, the Q3 is the output Q of the flip-flop circuit 363, the Q4 is the output Q of the flip-flop circuit 365, and the Q5 is the output Q of the flip-flop circuit 364.

Further, the E1 and E2 are respectively output signals of the AND circuits 370 and 369; the signals W3~W0 are respectively the output signals of the AND circuits 383~380. Furthermore, the signals S1N and S2N are outputted from the buffer circuits 392 and 393 of FIG. 17.

In the part A, when first pulse of the strobe signal HD-STB-N is inputted, as shown by part J, the signal Q1 occurs. Continuously, when second pulse of the strobe signal HD-STB-N is inputted, as shown by part K, the signal Q2 occurs. Further, whenever the signal Q1 rises, the state of the signal Q3 reverses, as shown by part L, the signal Q3 moves to "High" level.

Following the movement of the signal Q3, the signals E1 and E2 occur. Following the next rise (second) of the signal E1, signal Q5 rises. Further, at the more next rise (third) of the signal E1, signal Q4 drops. Furthermore, at the rise (fourth) following the more next rise of the signal E1, the signal Q5 drops.

The signals W3~W0 occur to follow the signal Q2, as shown by part O and part P, the signal W3 are outputted twice, continuously, the signal W2, the signal W1, the signal W0 are respectively outputted twice (two pulses).

Whenever respective pulses of the signals W3~W0 occur, data writing process is performed with respect to the memory circuit MEM2 of FIGS. 11A-11B. When the first pulse of the signals W3~W0 occurs, the data writing process is performed for odd-numbered dot; and when the second pulse of the signals W3~W0 occurs, the data writing process is performed for even-numbered dot.

Data writing instruction signal of the first pulse occurs on the basis of the inputted strobe signal HD-STB-N as shown by part A, part C, part E, part G. Data writing instruction signal of the second pulse occurs on the basis of the inputted strobe signal HD-STB-N as shown by part B, part D, part F, part H.

After all data writing of bit 3~bit 0 of correction data is ended through the above described process, as shown part Q, the latch signal HD-LOAD is set to "Low" level so as to enable a forwarding of print data to be performed.

When starting to print one line, the synchronous signal HD-HSYNC-N is inputted (part R) for data forwarding of odd-numbered dot. Next, as shown by part U, the print data of odd-numbered dot is forwarded. According to the latch signal HD-LOAD shown by part S, data that is shifted by the shift register circuit (FFA(1)~FFD(1), . . . , FFA(24)~FFD(24)) is latched by latch elements (LTA(1)~LTD(1), . . . , LTA(24)~LTD(24)).

Further, as shown part W, the strobe signal HD-STB-N moves to "Low" level, light emitting drive of LED element is performed. When print data is in ON state and the strobe signal HD-STB-N becomes "Low" level to correspond to part W and part X, the LED element is driven to emit light. Likewise, as shown by part V, data forwarding of even-numbered dot is performed, and the data is latched by pulse of part T.

Figure 20:
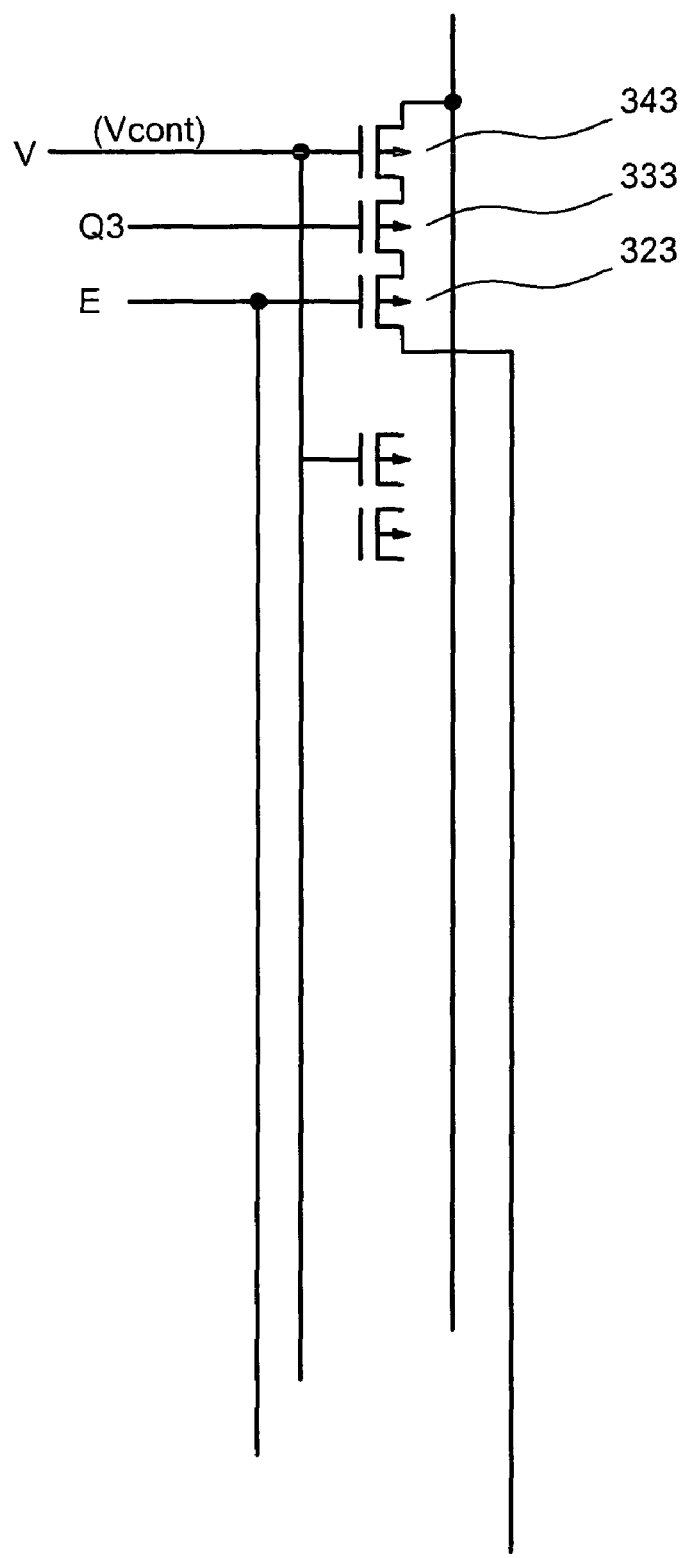
FIG. 20 is an operation explanation diagram of LED drive use circuit of embodiment 2.

FIG. 20 is an operation explanation diagram of LED drive use circuit of embodiment 2.

The drawing is to explain operation of LED drive use circuit having a light amount correction function of LED dot. Here, dot correction data Q3~Q0 in drawing are set by concrete data for dot correction of LED.

Corresponding to dot correction data Q3~Q0, negative logic signals are inputted. For example, output data (ODD3~ODD0) of correction memory MEM may be set to "1110". The signals are inputted to the multiplexer circuit MUX2, and is outputted by PMOS switch provided in the multiplexer circuit MUX2, and are inputted as signals Q3~Q0.

As described above, in the multiplexer circuit using PMOS transistor serving as switch element, there is no any hindrance for the transfer of data whose signal level is "High". For example, with respect to the data input of about 5V, output voltage of about 5V can be obtained.

As compared with it, when transferring "Low" level, because the electric potential corresponding to a threshold voltage of MOS transistor rises, even if a voltage of about 0V is inputted, an output voltage rises to an electric potential of about 1V.

As a result, when the power source VDD is 5V, the electric potentials of the signals Q3~Q0 respectively are 5V, 5V, 5V, 1V, these voltages are respectively provided to the gates of the PMOS transistors 333~330. Thereby, in the PMOS transistors 333~330, the PMOS transistors 333~331 are turned off, the PMOS transistor 330 is turned on.

At that time, the source electric potential of the PMOS transistor 330 is higher than a threshold value (about 1V) of the transistor by the gate electric potential of about 1V, so it becomes about 2V. The electric potential also is the drain electric potential of the PMOS transistor 340.

The drain electric potential of the PMOS transistor 340 does not depend upon the electric potential of the drive terminal DO, for example, even if a regular direction voltage changes due to drive state of LED, it is possible to eliminate the change of the drain electric potential of the PMOS transistor 340. Also it is possible to drop Vds dependence of drain electric current cause by that drain electric current Id changes slightly since the voltage Vds between drain and source of MOS transistor operating in a saturation area changes. Thereby, it is possible to inhibit the change of the drain electric current of the PMOS transistor 340 to a negligible degree.

The operation of the circuit composed of the PMOS transistors 340 and 330 is obtained by such mechanism as circuit that is known as a cascade constant electric current circuit, it is possible to improve character of drive circuit with the above described structure.

Regarding the print data, the data that if forwarded via the shift register circuit composed of the flip-flop circuits FFA(1)~ FFA(24) and the like of FIGS. 11A-11B becomes ON state; is latched by the latch circuits LTA(1)~LTA(24); is changed to negative logic data via the output QN of these latch elements and is outputted to the terminal E. Therefore, the signal level of the terminal E is about 0V when it is instructed to print.

The signal inputted to the terminal V is the voltage Vcont outputted from the control voltage generating circuit ADJ of FIGS. 11A-11B, the control voltage generating circuit ADJ is composed of these components of 41, the 61~68 in FIG. 6. The voltage Vcont in the process that the LED drive is changed from OFF state to ON state and is changed again to ON state is changed is that explained by using FIG. 9.

If supposing that the voltage between gate and source the when the PMOS transistors 340~344 are turned on is 2V, the voltage Vcont in the process that the LED drive is changed from OFF state to ON state and is changed again to ON state changes from 5V to 3V, and changes again from 3V to 5V (i.e. 5V→3V→5V).

Through the voltage, the state of the PMOS transistors 340~344 whose gates are provided by the voltage is changed from OFF to ON, and is changed again from ON to OFF (i.e. OFF→ON→OFF).

However, in the PMOS transistors 333~330, the PMOS transistors 333~331 become OFF, the PMOS transistor 330 becomes ON, and the PMOS transistors 320~324 continue ON state. Therefore, as shown by the broken line in FIG. 20, electric current occurs from the PMOS transistor 344 as electric current "im" and electric current occurs from the PMOS transistor 340 as electric current "io" so as to drive LED element via the terminal DO. In the above description, such case was explained that the output data (ODD3~ODD0) of correction memory MEM is "1110". But, according to the output data from the correction memory MEM2, the ON/OFF states of the PMOS transistors 333~330 are set, so it is possible to generate drive electric current of different 16 ways.

Explanation of Effect:

In the embodiment, a correction drive segment for dot correction is formed from a circuit composed of first, second and third PMOS transistors that are connected in series, a control voltage is supplied to the gate of the first PMOS transistor according to a drive electric current value, dot correction data is inputted to the second PMOS transistor, a drive ON/OFF instruction signal is inputted to the gate of the third PMOS transistor. Therefore, it is unnecessary to provide a NAND circuit (for example, the logical circuit 42a in FIG. 4) that is necessary in comparison example, as a previous segment circuit of PMOS transistor for performing a dot correction drive with respect to 4 bits part.

In addition, through switching a control voltage that is provided to the gate of the first PMOS transistor, according to the drive ON or drive OFF of LED, when it is LED drive OFF, the first PMOS transistor is turned off so that the electric charge does not continue to charge in the drain terminal. Therefore, it is possible to eliminate the occurrence of great overshoot electric current when starting to drive LED element. As a result, it is possible to prevent the LED element form degrading.

Moreover, the following is to add a postscript regarding the summary structure of LED head to which the present invention is applied.

Figure 21:
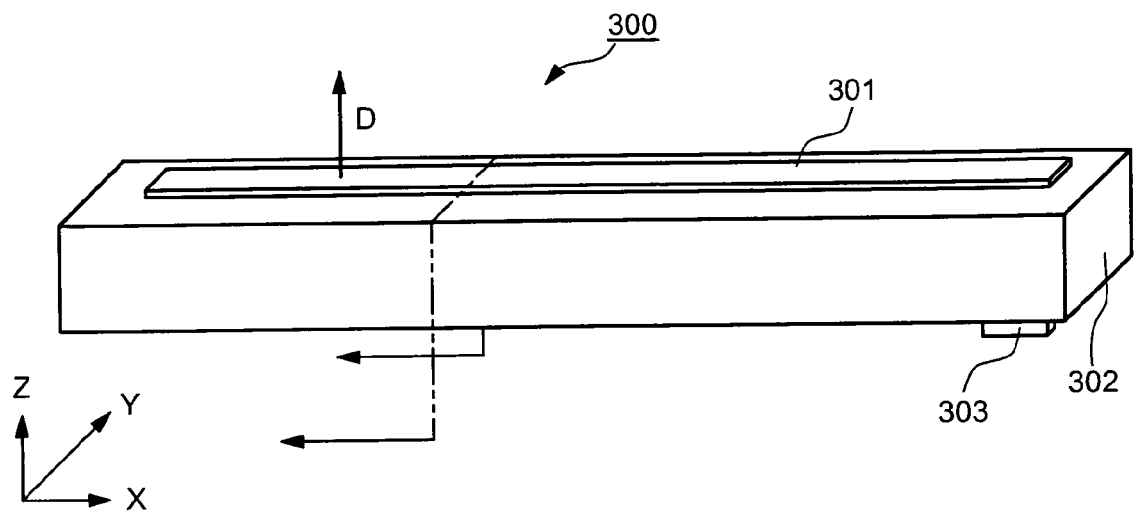
FIG. 21 is an appearance cubic diagram of LED head applying the present invention.

FIG. 21 is an appearance cubic diagram of LED head applying the present invention.

In FIG. 21, 301 is a rod lens array obtained by arranging plural lenses of rod shape along a left-right direction. 302 is a holder to hold the rod lens array 301 and members to form LED head 300. The paper size, the paper feeding method, the layout type and the print mode is a connector for connecting cable to supply electric power from the outside of the LED head 300 and signal used for controlling internal circuit in the LED head 300. An arrow D indicates a light output direction.

Figure 22:
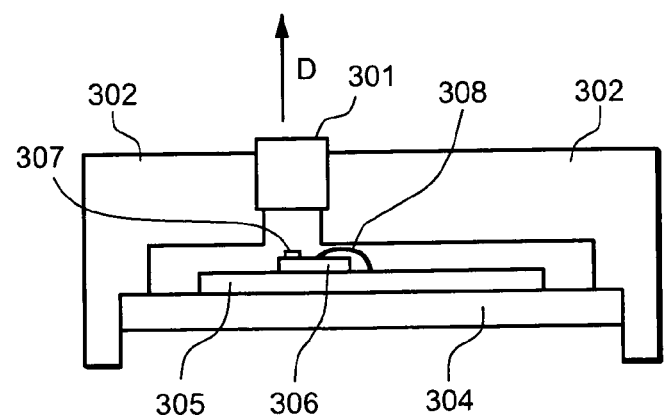
FIG. 22 is a Y-Z cross section obtained along Y-Z plane in FIG. 21.

FIG. 22 is a Y-Z cross section obtained along Y-Z plane in FIG. 21.

In FIG. 22, 304 is a member to load a light emitting unit in the LED head 300. Here, the light emitting unit is an assembly body of a wiring substrate 305, a driver IC 306, and a LED element 307. The wiring substrate 305 is formed by performing a wiring on a substrate such as glass epoxy substrate and is used for mounting and connecting with electric parts. The driver IC 306 is formed by integrating plural driving circuits of the present invention and is used to drive the LED element 307. The LED element 307 is a light emitting element formed in a thin film shape and is stuck on the surface of the driver IC 306 in embodiment. The LED element 307 is furnished to correspond to respective driving circuits of the driver IC 306 and a great of the LED element 307 are arranged along the left-right direction of the FIG. 21.

Here, a connection of the LED element 307 and the driver IC 306 is realized by electrode wiring closely sticking on the respective surfaces of the LED element 307 and the driver IC 306. A bonding wire 308 is used to connect pads respectively placed on the wiring substrate 305 and the driver IC 306. The electric power and the signal that are inputted via the connector 303 are supplied to the driver IC 306 via the bonding wire 308. The base member 304 is pressed upwardly by a damper (not shown), is held by the holder 302 and is used to perform a position decision of the LED element 307 and the rod lens array 301. The LED element 307 is driven by the driver IC 306 to emit light. The light emitted by the LED element 307 is outputted along a direction of the arrow D via the rod lens array 301 to form an image. In the case to use the LED head 300 as an exposing section of an electrophotographic printer serving as an image forming apparatus, a photosensitive drum is furnished in the direction of the arrow D, and a distance between the LED head 300 and the photosensitive drum is adjusted for enabling the light emitted by the LED element 307 to be used to form an image on the surface of the photosensitive drum.

THE UTILIZATION POSSIBILITY IN INDUSTRY

In the embodiment 1 and the embodiment 2, such case was explained that the driving circuit is used in electrophotographic printer using light source of LED. However, the present invention is not be limited by the case. That is, as light source, it is possible to adopt organic EL head using organic EL elements. Then, the present invention also can be applied to the organic EL head having the same structure. Further, the present invention also can be applied to the case to drive array of heat emitting resistances in thermal printer and array of display elements in displaying device.

The present invention is not limited to the foregoing embodiment or example but many modifications and variations are possible within the spirit and scope of the appended claims of the invention.

What is claimed is:

1. A driving circuit, comprising:
    a drive transistor configured to supply a drive electric current to record elements to construct an array so that the drive electric current drives the record elements;
    a reference electric current generating circuit configured to generate a reference electric current and a control voltage according to a reference voltage, so that the generated reference electric current and the generated control voltage respectively control the drive electric current and the drive transistor; and
    a control voltage output section configured to input a drive signal and output the generated control voltage according to the drive signal,
    wherein the drive transistor is composed of a first drive transistor and a second drive transistor that are connected in series; and
    the reference electric current generating circuit includes:
        a trapezoid wave circuit configured to input the drive signal, change the shape of the drive signal to a trapezoidal shape by adding transition time, and output the drive signal in the trapezoidal shape, and
        a feedback circuit configured to input the reference voltage and generate the reference electric current according to the reference voltage and the drive signal in the trapezoidal shape,
    wherein the first drive transistor is configured to receive at a control terminal thereof the control voltage outputted from control voltage output section, and operate according to the received control voltage; and
    the second drive transistor is configured to receive at a control terminal thereof a drive electric current ON/OFF signal to control on/off of the drive electric current, and operate according to the received drive electric current ON/OFF signal.

2. The driving circuit according to claim 1, wherein the control voltage output section includes a delay circuit that delays the drive signal inputted to the control voltage output section.

3. The driving circuit according to claim 1, wherein the feedback circuit includes:
    an operational amplifier having a first input terminal, a second input terminal and an output terminal, the operational amplifier being configured to input the reference voltage at the first input terminal, input a feedback signal at the second terminal, generate the control voltage, and output the generated control voltage to the output terminal;
    a third transistor having a first terminal, a second terminal connected with a power source, and a third terminal connected with the second input terminal of the operational amplifier, the output of the operational amplifier being inputted to the first terminal;
    a resistance element having a first end and a second end, the first end being connected with the third terminal of the third transistor; and
    a fourth transistor having a first terminal connected with the second end of the resistance element, a second terminal connected with an output end of the trapezoid wave circuit, and a third terminal connected with ground.

4. A driving circuit, comprising:
a driving section configured to supply a drive electric current to record elements to construct an array, the drive electric current driving the record elements; and
a reference electric current generating circuit configured to generate a reference electric current and a control voltage according to a reference voltage, so that the generated reference electric current and the generated control voltage respectively control the drive electric current and the drive section; and
a control voltage output section configured to input a drive signal and output the generated control voltage according to the drive signal,
wherein the drive section is composed of a plurality of series connection circuits that are connected in parallel, each series connection circuit being composed of a first drive transistor, a second drive transistor and a third drive transistor that are connected in series;
the reference electric current generating circuit includes:
a trapezoid wave circuit configured to input the drive signal, change the shape of the drive signal to a trapezoidal shape by adding transition time, and output the drive signal in the trapezoidal shape, and
a feedback circuit configured to input the reference voltage and generate the reference electric current according to the reference voltage and the drive signal in the trapezoidal shape,
wherein the first drive transistor of each series connection circuit is configured to receive at a control terminal thereof the control voltage outputted from control voltage output section, and operate according to the received control voltage,
the second drive transistor of each series connection circuit is configured to receive at a control terminal thereof a drive electric current adjustment signal to adjust an electric current value of the drive electric current, and
the third drive transistor of each series connection circuit is configured to receive at a control terminal thereof a drive electric current ON/OFF signal to control on/off of the drive electric current, and operate according to the received drive electric current ON/OFF signal.

5. The driving circuit according to claim 4, wherein the control voltage output section includes a delay circuit that delays the drive signal inputted to the control voltage output section.

6. The driving circuit according to claim 4, wherein the feedback circuit includes:
an operational amplifier having a first input terminal, a second input terminal and an output terminal, the operational amplifier being configured to input the reference voltage at the first input terminal, input a feedback signal at the second terminal, generate the control voltage, and output the generated control voltage to the output terminal;
a third transistor having a first terminal, a second terminal connected with a power source, and a third terminal connected with the second input terminal of the operational amplifier, the output of the operational amplifier being inputted to the first terminal;
a resistance element having a first end and a second end, the first end being connected with the third terminal of the third transistor; and
a fourth transistor having a first terminal connected with the second end of the resistance element, a second terminal connected with an output end of the trapezoid wave circuit, and a third terminal connected with ground.

7. A driving circuit, comprising:
a driving section configured to supply a drive electric current to record elements to construct an array, the drive electric current driving the record elements; and
a reference electric current generating circuit configured to generate a reference electric current and a control voltage according to a reference voltage, so that the generated reference electric current and the generated control voltage respectively control the drive electric current and the drive section; and,
a control voltage output section configured to input a drive signal and output the generated control voltage according to the drive signal,
wherein the drive section has a main driving section that is composed of a first drive transistor and a second drive transistor that are connected in series, and a subsidiary driving section that is composed of a plurality of series connection circuits that are connected in parallel, each series connection circuit being composed of a first drive transistor, a second drive transistor and a third drive transistor that are connected in series;
the reference electric current generating circuit includes:
a trapezoid wave circuit configured to input the drive signal, change the shape of the drive signal to a trapezoidal shape by adding transition time, and output the drive signal in the trapezoidal shape, and
a feedback circuit configured to input the reference voltage and generate the reference electric current according to the reference voltage and the drive signal in the trapezoidal shape,
wherein the first drive transistor of the main driving section and the first drive transistor of each series connection circuit of the subsidiary driving section are configured to receive at respective control terminals thereof the control voltage outputted from control voltage output section, and operate according to the received control voltage,
the second drive transistor of each series connection circuit of the subsidiary driving section is configured to receive at a control terminal thereof a drive electric current adjustment signal to adjust an electric current value of the drive electric current, and
the second transistor of the main driving section and the third drive transistor of each series connection circuit of the subsidiary driving section are configured to receive at respective control terminals thereof a drive electric current ON/OFF signal to control on/off of the drive electric current, and operate according to the received drive electric current ON/OFF signal.

8. The driving circuit according to claim 7, wherein the control voltage output section includes a delay circuit that delays the drive signal inputted to the control voltage output section.

9. The driving circuit according to claim 7, wherein the feedback circuit includes:
an operational amplifier having a first input terminal, a second input terminal and an output terminal, the operational amplifier being configured to input the reference voltage at the first input terminal, input a feedback signal at the second terminal, generate the control voltage, and output the generated control voltage to the output terminal;
a third transistor having a first terminal, a second terminal connected with a power source, and a third terminal connected with the second input terminal of the operational amplifier, the output of the operational amplifier being inputted to the first terminal;

a resistance element having a first end and a second end, the first end being connected with the third terminal of the third transistor; and a fourth transistor having a first terminal connected with the second end of the resistance element, a second terminal connected with an output end of the trapezoid wave circuit, and a third terminal connected with ground.

10. A LED head, comprising a driving circuit, wherein the driving circuit includes:

a drive transistor configured to supply a drive electric current to record elements to construct an array, the drive electric current driving the record elements;

a reference electric current generating circuit configured to generate a reference electric current and a control voltage according to a reference voltage, so that the generated reference electric current and the generated control voltage respectively control the drive electric current and the drive transistor; and a control voltage output section configured to input a drive signal and output the generated control voltage according to the drive signal, wherein the drive transistor is composed of a first drive transistor and a second drive transistor that are connected in series; and the reference electric current generating circuit includes:

a trapezoid wave circuit configured to input the drive signal, change the shape of the drive signal to a trapezoidal shape by adding transition time, and output the drive signal in the trapezoidal shape, and a feedback circuit configured to input the reference voltage and generate the reference electric current according to the reference voltage and the drive signal in the trapezoidal shape, wherein the first drive transistor is configured to receive at a control terminal thereof the control voltage outputted from control voltage output section, and operate according to the received control voltage; and the second drive transistor is configured to receive at a control terminal thereof a drive electric current ON/OFF signal to control on/off of the drive electric current, and operate according to the received drive electric current ON/OFF signal.

11. The LED head according to claim 10, wherein the control voltage output section includes a delay circuit that delays the drive signal inputted to the control voltage output section.

12. A LED head, comprising a driving circuit, wherein the driving circuit includes:

a driving section configured to supply a drive electric current to record elements to construct an array, the drive electric current driving the record elements; and a reference electric current generating circuit configured to generate a reference electric current and a control voltage according to a reference voltage, so that the generated reference electric current and the generated control voltage respectively control the drive electric current and the drive section; and a control voltage output section configured to input a drive signal and output the generated control voltage according to the drive signal, wherein the drive section is composed of a plurality of series connection circuits that are connected in parallel, each series connection circuit being composed of a first drive transistor, a second drive transistor and a third drive transistor that are connected in series;

the reference electric current generating circuit includes:

a trapezoid wave circuit configured to input the drive signal, change the shape of the drive signal to a trapezoidal shape by adding transition time, and output the drive signal in the trapezoidal shape, and a feedback circuit configured to input the reference voltage and generate the reference electric current according to the reference voltage and the drive signal in the trapezoidal shape, wherein the first drive transistor of each series connection circuit is configured to receive at a control terminal thereof the control voltage outputted from control voltage output section, and operate according to the received control voltage, the second drive transistor of each series connection circuit is configured to receive at a control terminal thereof a drive electric current adjustment signal to adjust an electric current value of the drive electric current, and the third drive transistor of each series connection circuit is configured to receive at a control terminal thereof a drive electric current ON/OFF signal to control on/off of the drive electric current, and operate according to the received drive electric current ON/OFF signal.

13. A LED head, comprising a driving circuit, wherein the driving circuit includes:

a driving section configured to supply a drive electric current to record elements to construct an array, the drive electric current driving the record elements; and a reference electric current generating circuit configured to generate a reference electric current and a control voltage according to a reference voltage, so that the generated reference electric current and the generated control voltage respectively control the drive electric current and the drive section; and a control voltage output section configured to input a drive signal and output the generated control voltage according to the drive signal, wherein the drive section has a main driving section that is composed of a first drive transistor and a second drive transistor that are connected in series, and a subsidiary driving section that is composed of a plurality of series connection circuits that are connected in parallel, each series connection circuit being composed of a first drive transistor, a second drive transistor and a third drive transistor that are connected in series;

the reference electric current generating circuit includes:

a trapezoid wave circuit configured to input the drive signal, change the shape of the drive signal to a trapezoidal shape by adding transition time, and output the drive signal in the trapezoidal shape, and a feedback circuit configured to input the reference voltage and generate the reference electric current according to the reference voltage and the drive signal in the trapezoidal shape, wherein the first drive transistor of the main driving section and the first drive transistor of each series connection circuit of the subsidiary driving section are configured to receive at respective control terminals thereof the control voltage outputted from control voltage output section, and operate according to the received control voltage, the second drive transistor of each series connection circuit of the subsidiary driving section is configured to receive at a control terminal thereof a drive electric current adjustment signal to adjust an electric current value of the drive electric current, and the second transistor of the main driving section and the third drive transistor of each series connection circuit of the subsidiary driving section are configured to receive at respective control terminals thereof a drive electric current ON/OFF signal to control on/off of the drive electric current, and operate according to the received drive electric current ON/OFF signal.

14. An image forming apparatus, comprising a LED head, wherein the LED head comprises a driving circuit, and the driving circuit includes:
a drive transistor configured to supply a drive electric current to record elements to construct an array, the drive electric current driving the record elements;
a reference electric current generating circuit configured to generate a reference electric current and a control voltage according to a reference voltage, so that the generated reference electric current and the generated control voltage respectively control the drive electric current and the drive transistor; and
a control voltage output section configured to input a drive signal and output the generated control voltage according to the drive signal,
wherein the drive transistor is composed of a first drive transistor and a second drive transistor that are connected in series; and
the reference electric current generating circuit includes:
a trapezoid wave circuit configured to input the drive signal, change the shape of the drive signal to a trapezoidal shape by adding transition time, and output the drive signal in the trapezoidal shape, and
a feedback circuit configured to input the reference voltage and generate the reference electric current according to the reference voltage and the drive signal in the trapezoidal shape,
wherein the first drive transistor is configured to receive at a control terminal thereof the control voltage outputted from control voltage output section, and operate according to the received control voltage; and
the second drive transistor is configured to receive at a control terminal thereof a drive electric current ON/OFF signal to control on/off of the drive electric current, and operate according to the received drive electric current ON/OFF signal.

15. The image forming apparatus according to claim 14, wherein the control voltage output section includes a delay circuit that delays the drive signal inputted to the control voltage output section.

16. An image forming apparatus, comprising a LED head, wherein the LED head comprises a driving circuit, and the driving circuit includes:
a driving section configured to supply a drive electric current to record elements to construct an array, the drive electric current driving the record elements; and
a reference electric current generating circuit configured to generate a reference electric current and a control voltage according to a reference voltage, so that the generated reference electric current and the generated control voltage respectively control the drive electric current and the drive section; and
a control voltage output section configured to input a drive signal and output the generated control voltage according to the drive signal,
wherein the drive section is composed of a plurality of series connection circuits that are connected in parallel, each series connection circuit being composed of a first drive transistor, a second drive transistor and a third drive transistor that are connected in series;
the reference electric current generating circuit includes:
a trapezoid wave circuit configured to input the drive signal, change the shape of the drive signal to a trapezoidal shape by adding transition time, and output the drive signal in the trapezoidal shape, and
a feedback circuit configured to input the reference voltage and generate the reference electric current according to the reference voltage and the drive signal in the trapezoidal shape,
wherein the first drive transistor of each series connection circuit is configured to receive at a control terminal thereof the control voltage outputted from control voltage output section, and operate according to the received control voltage,
the second drive transistor of each series connection circuit is configured to receive at a control terminal thereof a drive electric current adjustment signal to adjust an electric current value of the drive electric current, and
the third drive transistor of each series connection circuit is configured to receive at a control terminal thereof a drive electric current ON/OFF signal to control on/off of the drive electric current, and operate according to the received drive electric current ON/OFF signal.

17. An image forming apparatus, comprising a LED head, wherein the LED head comprises a driving circuit, and the driving circuit includes:
a driving section configured to supply a drive electric current to record elements to construct an array, the drive electric current driving the record elements; and
a reference electric current generating circuit configured to generate a reference electric current and a control voltage according to a reference voltage, so that the generated reference electric current and the generated control voltage respectively control the drive electric current and the drive section; and
a control voltage output section configured to input a drive signal and output the generated control voltage according to the drive signal,
wherein the drive section has a main driving section that is composed of a first drive transistor and a second drive transistor that are connected in series, and a subsidiary driving section that is composed of a plurality of series connection circuits that are connected in parallel, each series connection circuit being composed of a first drive transistor, a second drive transistor and a third drive transistor that are connected in series;
the reference electric current generating circuit includes:
a trapezoid wave circuit configured to input the drive signal, change the shape of the drive signal to a trapezoidal shape by adding transition time, and output the drive signal in the trapezoidal shape, and
a feedback circuit configured to input the reference voltage and generate the reference electric current according to the reference voltage and the drive signal in the trapezoidal shape,
wherein the first drive transistor of the main driving section and the first drive transistor of each series connection circuit of the subsidiary driving section are configured to receive at respective control terminals thereof the control voltage outputted from control voltage output section, and operate according to the received control voltage,
the second drive transistor of each series connection circuit of the subsidiary driving section is configured to receive at a control terminal thereof a drive electric current adjustment signal to adjust an electric current value of the drive electric current, and the second transistor of the main driving section and the third drive transistor of each series connection circuit of the subsidiary driving section are configured to receive at respective control terminals thereof a drive electric current ON/OFF signal to control on/off of the drive electric current, and operate according to the received drive electric current ON/OFF signal.

* * * * *